(12) United States Patent
Baird et al.

(10) Patent No.: US 9,225,763 B2
(45) Date of Patent: Dec. 29, 2015

(54) DISTRIBUTED OVERLAY BROWSER FOR TRANSPARENT STREAMING MEDIA SUPPORT IN VIRTUALIZED DESKTOP ENVIRONMENT

(75) Inventors: Randall B. Baird, Austin, TX (US); Stephan E. Friedl, Frederick, CO (US); Thomas M. Wesselman, Issaquah, WA (US)

(73) Assignee: Cisco Technology, Inc., San Jose, CA (US)

( * ) Notice: Subject to any disclaimer, the term of this patent is extended or adjusted under 35 U.S.C. 154(b) by 1091 days.

(21) Appl. No.: 13/154,558

(22) Filed: Jun. 7, 2011

(65) Prior Publication Data

US 2012/0317295 A1    Dec. 13, 2012

(51) Int. Cl.
*G06F 15/16* (2006.01)
*H04L 29/08* (2006.01)
*H04L 29/06* (2006.01)

(52) U.S. Cl.
CPC ............... *H04L 67/02* (2013.01); *H04L 67/38* (2013.01)

(58) Field of Classification Search
CPC .................................................. H04L 29/0809
USPC ................. 709/208, 209, 211, 228, 227, 229; 455/517, 219, 225, 551, 560
See application file for complete search history.

(56) References Cited

U.S. PATENT DOCUMENTS

| | | | |
|---|---|---|---|
| 6,389,462 B1 * | 5/2002 | Cohen et al. | 709/218 |
| 6,738,804 B1 * | 5/2004 | Lo | 709/219 |
| 7,568,056 B2 | 7/2009 | Danilak | |
| 8,135,616 B2 * | 3/2012 | Callaghan et al. | 705/14.46 |
| 8,782,124 B2 * | 7/2014 | Clark et al. | 709/203 |
| 2003/0142127 A1 * | 7/2003 | Markel | 345/738 |
| 2006/0104259 A1 | 5/2006 | Caballero-McCann et al. | |
| 2007/0116246 A1 | 5/2007 | Walker et al. | |
| 2009/0248802 A1 * | 10/2009 | Mahajan et al. | 709/204 |

(Continued)

OTHER PUBLICATIONS

Greenberg, et al., "Adaptive Offloading for Pervasive Computing," IEEE Pervasive Computing, vol. 3, No. 3, Jul.-Sep. 2004, pp. 66-73.

(Continued)

*Primary Examiner* — Hassan Kizou
*Assistant Examiner* — Abdelnabi Musa
(74) *Attorney, Agent, or Firm* — Edell, Shapiro & Finnan, LLC

(57) ABSTRACT

Techniques are provided for establishing an integrated and transparent overlay of a browser window for rendering data such as streaming media on a client endpoint device. A web browser on a Hosted Virtual Desktop (HVD) draws HVD display image comprising a browser window and communicates it to the client endpoint device for display, via a virtual desktop interface (VDI) protocol. The browser window comprises zero or more host-provided window elements such as a window frame and at least one placeholder element where a client-provided frameless browser window may be rendered. A browser (or browser extension) on the HVD works together with a browser server on the client endpoint device to render data such as streaming media in the client-provided frameless browser window in place of the placeholder, before displaying the frameless browser window and the HVD display as an integrated display at the client endpoint device.

34 Claims, 17 Drawing Sheets

(56) References Cited

U.S. PATENT DOCUMENTS

| | | | |
|---|---|---|---|
| 2009/0249216 A1* | 10/2009 | Charka et al. | 715/744 |
| 2009/0287772 A1* | 11/2009 | Stone et al. | 709/203 |
| 2010/0042718 A1* | 2/2010 | Morris | 709/224 |
| 2010/0138744 A1* | 6/2010 | Kamay et al. | 715/716 |
| 2010/0153544 A1* | 6/2010 | Krassner et al. | 709/224 |
| 2011/0061046 A1* | 3/2011 | Phillips | 717/176 |
| 2012/0226985 A1* | 9/2012 | Chervets et al. | 715/735 |
| 2012/0284632 A1* | 11/2012 | Baird | 715/749 |

OTHER PUBLICATIONS

Cisco Data Sheet, "Cisco Unified Survivable Remote Site Telephone Version 4.1," 2008.
HDX™ Technologies, hdx.citrix.corn, 2 pages.
Wyse Thin Computing Software, Delivering the best experience over virtualized desktop environments, Summary Data, www.wyse.com, 9 pages.

* cited by examiner

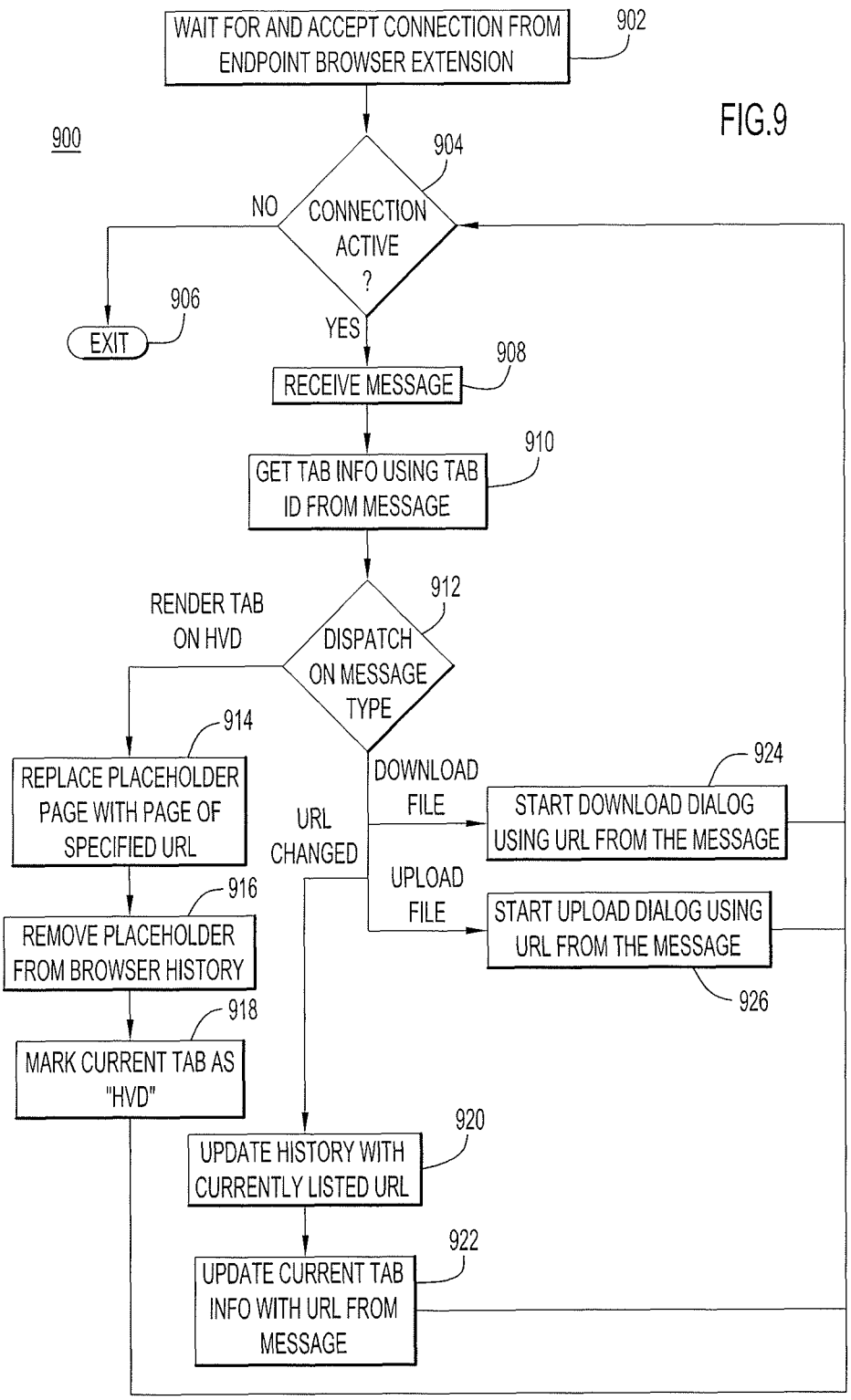

DISTRIBUTED OVERLAY BROWSER FOR TRANSPARENT STREAMING MEDIA SUPPORT IN VIRTUALIZED DESKTOP ENVIRONMENT

TECHNICAL FIELD

The present disclosure relates generally to virtualized desktop environments and more particularly to providing integrated and transparent rendering of media such as streaming media in an overlay browser on a client endpoint device.

BACKGROUND

Web browsing is an increasingly popular activity in business and personal settings, and with the growth of network-connected devices such as personal computers, web-capable mobile phones and tablets has come increased demand for the provision of media over the web. For example, users may desire to conduct web-based audio and video conferencing, buy or rent movies or television shows over the web, view video or animation encoded for Adobe Flash, listen to streaming radio stations, or even play games with users around the world via the Internet.

When virtual or cloud-based desktops are used, web browsing may be virtualized along with other hosted applications. That is, a browser application may run in a hosted virtual desktop (HVD), or run as a hosted virtual application (HVA) while the browser window is displayed to a user on a remote client endpoint device such as a computer or mobile phone. Virtualized browsing presents a set of unique problems in that media such as streaming media may be more difficult to virtualize than simple text and graphics.

BRIEF DESCRIPTION OF THE DRAWINGS

FIG. 9 is an example of a flow chart generally depicting operation of a host browser server at the HVD.

DESCRIPTION OF EXAMPLE EMBODIMENTS

Overview

Techniques are provided for establishing an integrated and transparent overlay of a browser window for rendering data such as streaming media on a client endpoint device. A web browser on a Hosted Virtual Desktop (HVD) draws a HVD display image comprising a browser window and communicates it to the client endpoint device for display, via a virtual desktop interface (VDI) protocol. The browser window comprises zero or more host-provided window elements such as a window frame and at least one placeholder where a client-provided frameless browser window may be rendered. A browser (or browser extension) on the HVD works together with a browser server on the client endpoint device to render data such as streaming media in the client-provided frameless browser window in place of the placeholder, before displaying the frameless browser window and the HVD display as an integrated display at the client endpoint device.

Example Embodiments

Figure 1:
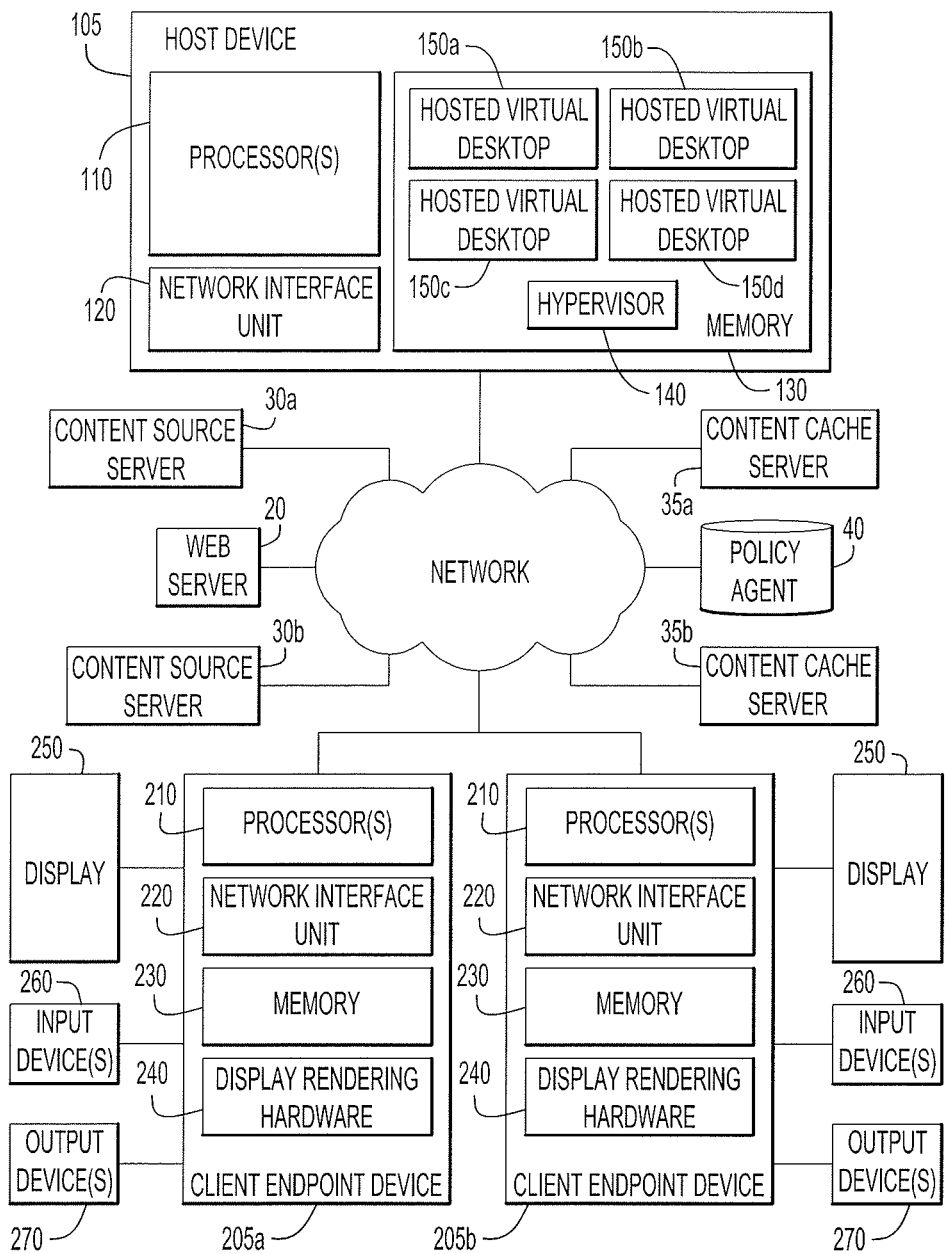
FIG. 1 is an example of a block diagram showing a virtual desktop interface (VDI) environment in which VDI connectivity can be established between client endpoint devices and one or more hosted virtual desktops.

Referring now to the Figures, an example of a block diagram showing a VDI environment in which VDI connectivity can be established between client endpoint devices and one or more hosted virtual desktops is shown in FIG. 1. The depicted VDI environment 100 includes host device 105, client endpoint devices 205a, 205b, web server 20, content servers 30a, 30b, content distribution cache servers 35a, 35b, and policy agent 40 which are connected over network 10 to each other. The VDI environment may include additional servers, clients, and other devices not shown, and individual components of the system may occur either singly or in multiples, for example, there may be more than one host device 105, and other networking components, e.g., routers and switches, may be used in the VDI environment 100. Similarly, web server 20, content servers 30a, 30b, and content cache servers 35a, 35b may be embodied in a single device.

Network 10 represents any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the VDI environment 100 may include any conventional or other communications devices to communicate over the networks via any conventional or other protocols, and may utilize any type of connection (e.g., wired, wireless, etc.) for access to the network.

Web server 20 is a conventional or other server for serving web pages including Hypertext Markup Language (HTML) documents and other content such as images or style sheets to the web browser 320. Content source servers 30a, 30b are conventional or other servers for serving data to a client or a content distribution cache server, e.g., a Darwin Streaming Server, Flash Media Server, Unreal Media Server, or the like. The content servers may provide any type of data, for example media such as streaming video and/or streaming audio, games or simulations, animations, scripts, or the like. Content data may be encapsulated as HTML or XHTML documents, or may be represented in a non-HTML format. Content cache servers 35a-b, e.g. Cisco Wide Area Application Engine (WAE) servers running the Application and Content Network System (ACNS), act as intermediate repositories for content received from content servers 30a-b. As is further described with respect to FIG. 2, the present embodiments transport data directly from content source servers 30 and/or content cache servers 35 to the client endpoint devices 205, without the data passing through the host device 105. By placing cache servers 35 at key points in network 10 and caching content (e.g., media content) from a content source server 30a-b, client endpoint 205a may receive content from the cache servers 35 instead of the content source 30, thereby reducing bandwidth consumption over the core portions of network 10 and reducing streaming latency. It is understood that many types of content servers 30 and distribution caches 35 stream media to clients; however, any type of content may be streamed.

Figure 2A:
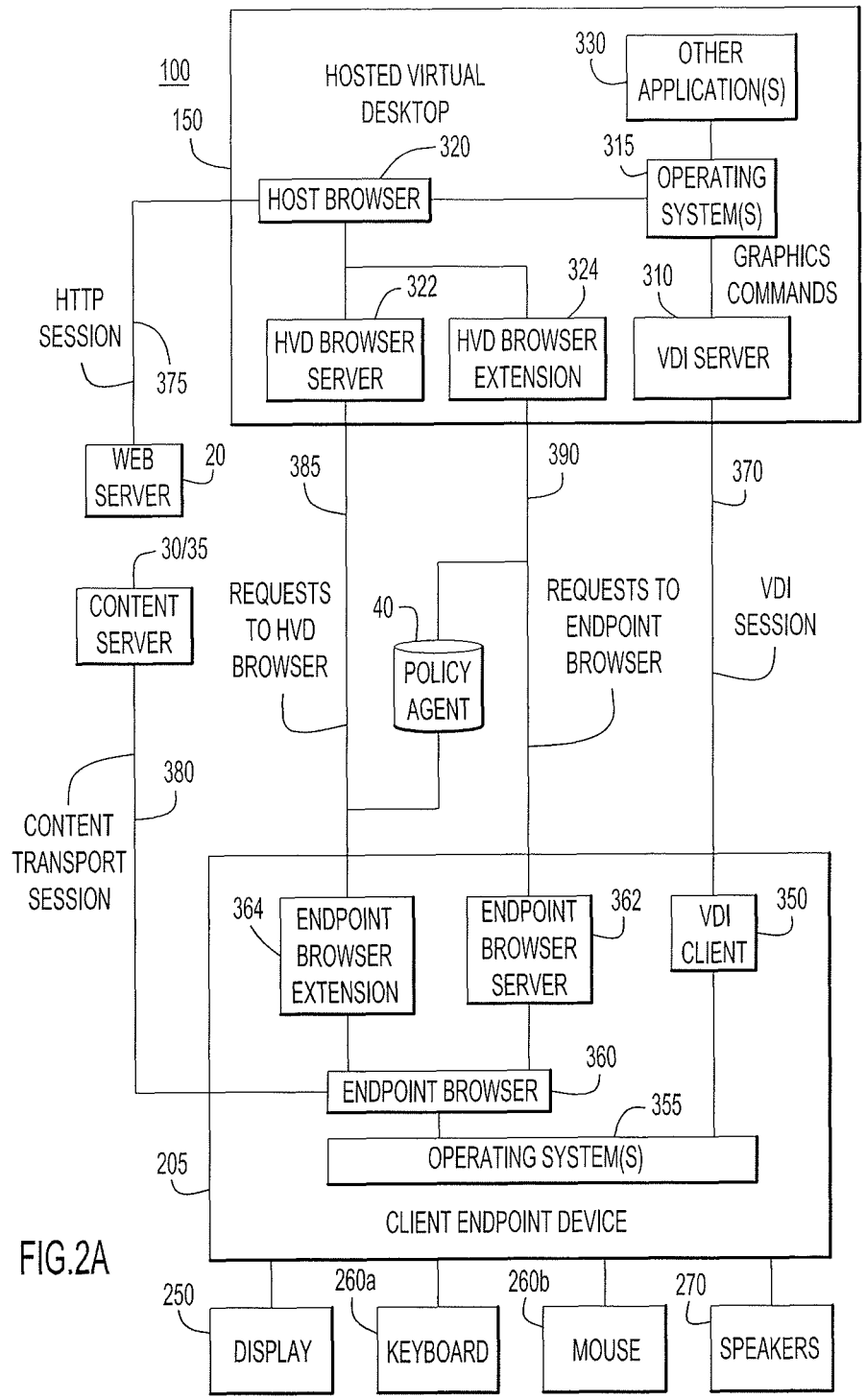
FIGS. 2A and B are two examples of a block diagram showing VDI, HTTP, browser communication and content transport sessions among a particular hosted virtual desktop (HVD), client endpoint device, web server and content server in the VDI environment.
Figure 2B:
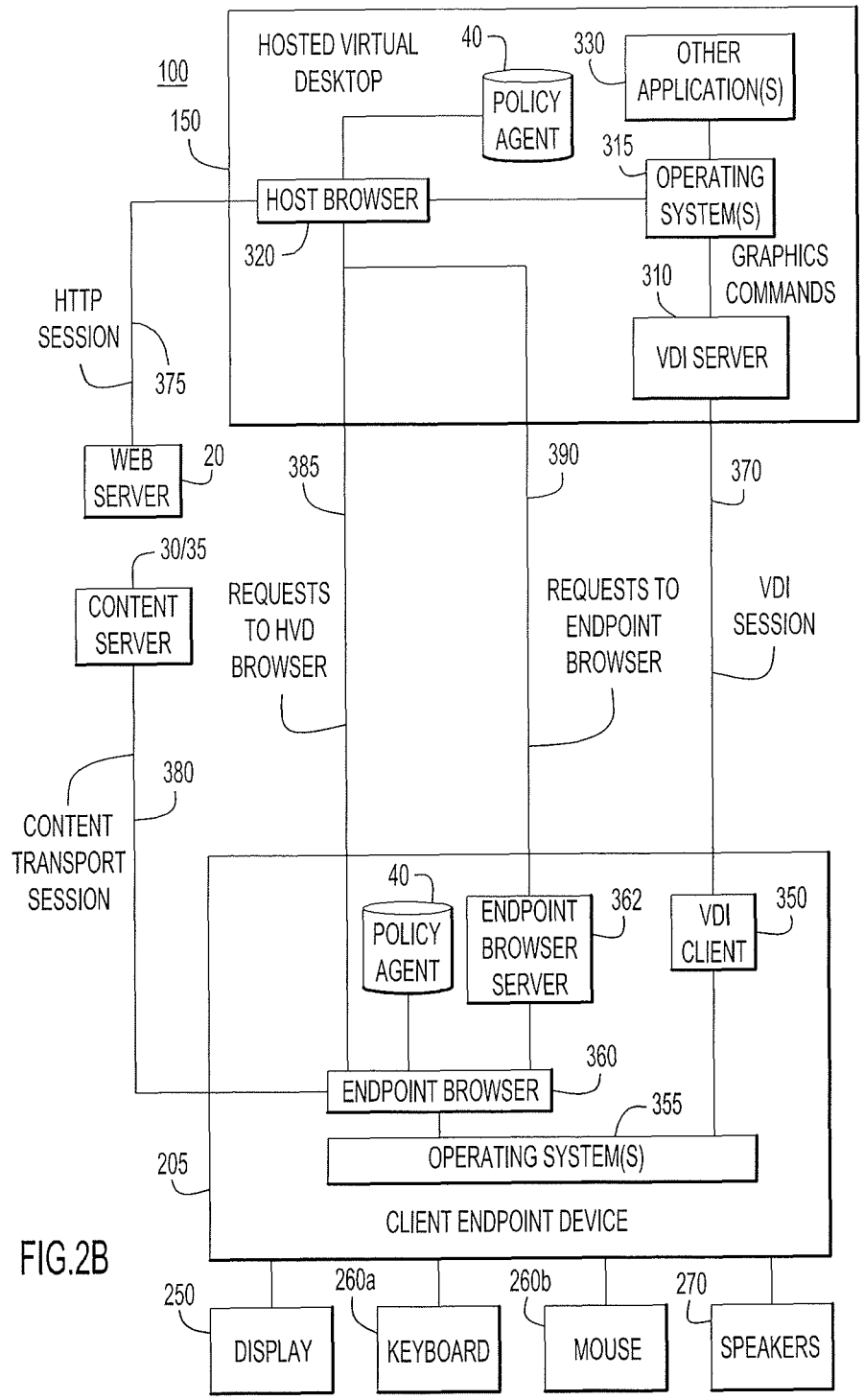

Policy agent 40 may be a separate network service as is depicted in FIGS. 1 and 2A, or it may reside locally on host device 105 (e.g., in hosted virtual desktops 150 or as a separate resident of memory 130) and client devices 205 as is depicted in FIG. 2B. As is further described with respect to FIGS. 2, 6, 8 and 10, the policy agent 40 is presented with a Uniform Resource Locator (URL), (e.g., via a query) and it applies one or more policies to report (e.g., via a query response) whether the URL should be rendered on the HVD 150 or the client endpoint device 205.

Host device 105 comprises one or more processors 110, a network interface unit 120, and memory 130. The processor 110 is, for example, a data processing device such as a microprocessor, microcontroller, system on a chip (SOC), or other fixed or programmable logic, that executes instructions for process logic stored in memory 130. The network interface unit 120 enables communication throughout the VDI environment, as shown in FIGS. 1 and 2. Memory 130 may be implemented by any conventional or other memory or storage device, and may include any suitable storage capacity. For example, memory 130 may comprise read only memory (ROM), random access memory (RAM), erasable programmable read-only memory (EPROM), magnetic disk storage media devices, optical storage media devices, flash memory devices, electrical, optical, or other physical/tangible memory storage devices. The memory 130 may comprise one or more computer readable storage media (e.g., a memory device) encoded with software comprising computer executable instructions and when the software is executed (by processor 110) it is operable to perform the operations described herein in connection with FIGS. 3-10.

The host device 105 may be, for example, a computing blade, a blade server comprising one or more solid state drives, or a blade center comprising one or more blade servers together with a blade chassis comprising common resources such as networking connections, input/output device connections, power connections, cooling devices, switches, etc. The host device 105 may be a component of a larger system, such as a Cisco Unified Computing System, or a data center that centralizes enterprise computing resources.

Resident in memory 130 are hypervisor 140, and multiple hosted virtual desktops (HVDs) 150a-d. The hypervisor or virtual machine monitor 140 presents a virtual operating platform to the HVDs 150a-d, and manages access to the host processor 110, network interface unit 120, memory 130 and other host resources, so that the HVDs 150a-d have access to appropriate host resources without disrupting each other's operation. Each HVD 150 operates independently of the other HVDs 150 and runs as a separate virtual machine on the host device 105, and each HVD 150 may run a different operating system if desired. Further operation of the HVDs is explained below with reference to FIGS. 3-10.

Each example client endpoint device 205a comprises one or more processors 210, a network interface unit 220, memory 230, and display rendering hardware 240. The processor 210 is, for example, a data processing device such as a microprocessor, microcontroller, system on a chip (SOC), or other fixed or programmable logic, that executes instructions for process logic stored in memory 230. The network interface unit 220 enables communication throughout the VDI environment, as shown in FIGS. 1 and 2. Memory 230 may be implemented by any conventional or other memory or storage device, and may include any suitable storage capacity. For example, memory 230 may comprise ROM, RAM, EPROM, magnetic disk storage media devices, optical storage media devices, flash memory devices, electrical, optical, or other physical/tangible memory storage devices. The memory 230 may comprise one or more computer readable storage media (e.g., a memory device) encoded with software comprising computer executable instructions and when the software is executed (by processor 210) it is operable to perform the operations described herein in connection with FIGS. 3-10. Display rendering hardware 240 may be a part of processor 210, or may be, e.g., a separate graphics processor, e.g., a Graphics Processor Unit (GPU).

The example client endpoint device 205 may be any conventional or other computer system or device, such as a thin client, computer terminal or workstation, personal desktop computer, laptop or netbook, tablet, mobile phone, set-top box, networked television, or other device capable of acting as a client in the described VDI environment.

The example client endpoint device 205 interfaces with display device 250, input device(s) 260, and output device(s) 270, and communicates with these devices in any suitable fashion, e.g., via a wired or wireless connection. The display device 250 may be any suitable display, screen or monitor capable of displaying information to a user of a client endpoint device, for example the screen of a tablet or the monitor attached to a computer workstation. Input device(s) 260 may include any suitable input device, for example, a keyboard, mouse, trackpad, touch input tablet, touch screen, camera, microphone, remote control, speech synthesizer, or the like. Output device(s) 270 may include any suitable output device, for example, a speaker, headphone, sound output port, or the like. The display device 250, input device(s) 260 and output device(s) 270 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

The functions of the processors 110 and 210 may each be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memories 130 and 230 each store data used for the computations or functions described herein (and/or to store software or processor instructions that are executed to carry out the computations or functions described herein). Alternatively, one or more computer readable storage media are provided and encoded with software comprising computer executable instructions and when the software is executed operable to performing the techniques described herein. Thus, functions of the process logic as described with reference to FIGS. 6 through 10, for example, may be implemented with fixed logic or programmable logic (e.g., software or computer instructions executed by a processor or field programmable gate array (FPGA)).

FIGS. 2A and B are two different examples of a block diagram showing virtual desktop interface (VDI), browser communication, Hypertext Transfer Protocol (HTTP) and content transport sessions among a HVD 150, client endpoint device 205, web server 20, and content server 30 or 35 in the VDI environment 100. For purposes of simplification, the other components of the VDI environment 100, e.g., other client endpoint devices, are not shown here. Further, although the description refers to the interaction between one HVD 150 and one client endpoint device 205, it is understood by those skilled in the art that each HVD 150 may interact with one or more client endpoint devices 205, and each client endpoint device 205 may interact with one or more HVDs 150 on a single or multiple host devices 105. Moreover, there may be more than one web server 20 and more than one content server 30 or 35 in the VDI environment 100.

The example HVD 150 comprises a VDI server 310, host operating system(s) 315, hosted web browser 320 (also referred to as "host web browser" or "HVD web browser"), and may also comprise one or more other application(s) 330. In the example of FIG. 2A, an HVD browser server 322 and HVD browser extension 324 are associated with the host web browser 320. The example client endpoint device 205 comprises a VDI client 350, operating system(s) 355, and client endpoint browser 360 (also referred to as "endpoint browser" or "client browser"), all of which reside in memory 230 (as shown in FIG. 1). Associated with client endpoint browser 360 are endpoint browser server 362 and, in the example of FIG. 2A, endpoint browser extension 364, which are also resident in memory 230. The client endpoint device 205 also comprises a display 250, input devices including keyboard 260a and mouse 260b, and output devices including speakers 270. The host web browser 320 and endpoint browser 360 may be any browser software capable of use in conjunction with the host operating system 315, for example Mozilla Firefox, Google Chrome, Microsoft Internet Explorer, Opera Software Opera, Apple Safari, etc.

FIG. 2A illustrates an example in which each browser 320, 360 is associated with a browser extension 324, 364, a host browser server 322 is present, and a single policy agent 40 is present as a separate network service. FIG. 2B illustrates an example in which neither browser 320, 360 is associated with a browser extension, the host browser server 322 is absent, and in which a policy agent 40 is resident on each of the HVD 150 and client device 205. These examples are not limiting, and it should be understood that one or both browsers 320, 360 may be associated with a browser extension, and that the location of the policy agent 40 is not required to be in any particular location (e.g., on the network or resident on the HVD/client device) if browser extensions are or are not implemented. The following description is applicable to both FIGS. 2A and 2B unless noted otherwise, with the understanding that when the functionality of the browser extensions 324, 364 is referred to, it is understood that such functionality in the example of FIG. 2B is performed by one or both of the HVD browser 320 and the combination of the endpoint browser 360 and its browser server 362. Similarly, when the functionality of the host browser server 322 is referred to, but the server is not present (e.g., in the example of FIG. 2B), then such functionality is performed by the HVD browser 320 and/or the host browser extension 324 (if present).

The VDI server 310 interacts with the host operating system 315 to provide virtual desktop interface functionality to the client endpoint device 205 over VDI session 370, which is a VDI protocol link that is established using any suitable VDI protocol, for example Citrix Independent Computing Architecture (ICA), VMWare PC over IP (PCoIP), Microsoft Remote Desktop Protocol (RDP), or other suitable protocol. For example, any application with which a user of the client endpoint device 205 is interacting is hosted by the HVD 150, while the window associated with the application is rendered by the client endpoint device 205. The windows are depicted and further described with reference to FIGS. 3 through 5. The VDI server 310 on the host may, for example, receive HVD display output from the host operating system 315 and send it to the VDI client 350 as an HVD display over VDI session 370. The VDI session may, for example, represent all windows in the HVD display as a single image, or it may indicate the position and size of each host-provided window element and placeholder in the HVD display, and/or the position and size of each client-provided window element and placeholder to be overlaid in the HVD display.

The VDI client 350 interacts with client operating system 355 to render the received HVD display for display on the client endpoint device 205. As will be further described with reference to FIGS. 3 through 5, the endpoint browser 360, endpoint browser server 362 and endpoint browser extension 364 may also modify the received HVD display, for example by rendering a client-provided frameless browser window over a placeholder portion of the HVD display, in the course of rendering it to display 250. The VDI client 350 also receives user input from the user interface, for example, the user types on keyboard 260a or exercises mouse 260b, and these inputs are translated by the VDI client 350 and sent to the VDI server 310 via VDI session 370.

After it receives the user input, VDI server 310 translates it into virtual keyboard and mouse inputs, and feeds it via host operating system 315 to host web browser 320 or another application 330, as if the applications and the input devices 260 were running on a single desktop computing device. The user inputs are processed by the appropriate application at the HVD, and HVD display images are generated by the operating system 315 and VDI server 310 for transmission back to the VDI client 350, which renders the HVD display and client-generated user elements for display to the user on display 250.

In another embodiment, host device 105 may execute hosted virtual applications (HVAs) from its memory 130, rather than full hosted virtual desktops 150. In this embodiment, client endpoint device 205 may use its VDI client 350 to interact with multiple host devices 105, each executing one or more HVAs, and use the client operating system 350 to composite the output of the HVAs to present a full windowed desktop on display 250.

The host web browser 320 and endpoint browser 360 work together with their respective browser servers 322, 362 and browser extensions 324, 364 to render web pages. For example, when a user of client endpoint device 205 interacts with a displayed browser window, the appropriate browser extension 324, 364 implements an application programming interface (API) defined by the browsers 320, 360, for use by browser extensions 324, 364. For example, some of the APIs allow the extensions 324, 364 to filter events associated with the user's interaction. For example, if the user is viewing a web page rendered by the HVD in a displayed browser window, and navigates to a different web page using, e.g., a web address such as a Uniform Resource Locator (URL), the HVD browser extension 324 filters the navigation request and queries policy agent 40, and policy agent 40 consults one or more policies to determine whether this URL should be rendered by the host web browser 320 or the endpoint browser 360. If the URL should be rendered by the host web browser 320, then the host web browser 320 requests and receives from HTML server 20, for example, an HTML- or XHTML-encoded web page associated with the URL, over HTTP session 375, and renders the page for display.

If, however, the URL should be rendered by the endpoint browser, then the HVD browser extension 324 establishes a connection 390 with the endpoint browser server 362, and requests that the endpoint browser server 362 instantiate a new instance of the endpoint browser 360. Endpoint browser 360 is deployed as a frameless browser, i.e., it does not render window framing, menus, or other browser controls. The instantiated endpoint browser 360 establishes a content transport session 380, for example an HTTP session, directly with content server 30 (or content cache server 35), requests and receives the appropriate data, and renders it for a user, for example as described with respect to FIGS. 3 through 5. If the user then navigates to a different web page, e.g., by opening up a new browser tab with a new URL, the endpoint browser extension 364 filters the navigation request and queries policy agent 40, and policy agent 40 consults one or more policies to determine whether this URL should be rendered by the host web browser 320 or the endpoint browser 360. If the URL should be rendered by the endpoint browser 360, then the current instance of endpoint browser 360 is signaled to render the new URL and the appropriate data associated with the new URL is rendered in the current instance of the endpoint browser 360. Alternatively, if the filtered URL is to be rendered in a separate window, for example if a new browser tab or browser instance is to render the URL, then a new instance of the endpoint browser 360 will be instantiated and requested to render the URL. If the URL should be rendered by the host browser 320, however, then the endpoint browser extension 364 establishes a connection 385 with the HVD browser server 322, and notifies the HVD browser server 322 to request and render the appropriate data associated with the new URL.

The policy agent 40 may implement one or more policies to determine which browser should render a particular URL. For example, in one embodiment, the policy agent 40 may utilize a policy that compares the Fully Qualified Domain Name (FQDN) of the URL with domain name data (e.g., a list of domain name records) on the policy agent. If a match is found, the policy agent 40 examines the located data (e.g., a record) to determine if the URL should be rendered by the HVD or endpoint. If no matching data is found, then the policy agent 40 may use a default value (e.g., a default record) to determine whether the HVD or endpoint should render the URL. In another embodiment, the policy agent 40 may use a partial FQDN matching policy, where if the queried FQDN is a child of an FQDN having domain name data (e.g., a record), the policy agent 40 uses the parent data to determine whether the HVD or endpoint should render the URL. In a different embodiment, the policy agent 40 may scan the page associated with the URL for particular content, for example a tag such as an <object> or <embed> tag whose URL references content server 30, or whose Multipurpose Internet Mail Extension (MIME) type indicates a type of object (e.g., audio, video, Java, etc.) that is designated to be rendered on the endpoint 205, or that is not renderable on the client, etc. In yet another embodiment, the policy agent 40 may scan the page associated with the URL for specialized (e.g., proprietary) tags inserted into the HTML that indicate whether the page should be rendered by the HVD or endpoint.

In another embodiment, the activity of the policy agent is suppressed if the browser request originates from an anchor located inside an inline frame, e.g., in an <iframe> element, so that such requests are always handled by the browser attempting to access the anchor. In a different embodiment, the activity of the policy agent is suppressed if the browser request is associated with a conferencing or screen sharing application, such as Cisco WebEx, IBM LotusLive Meetings, Microsoft Office Live Meeting, Skype Screen Sharing, etc., so that such requests are always handled by the HVD browser. In these embodiments, the policy suppression provides an improved browser quality because it avoids having an individual web page partially rendered by the host browser and partially rendered by the client endpoint browser. Policy suppression may also permit a set of pages that share local data via a scripting language, for example javascript, to function properly by ensuring that the pages are all executed within a single browser instance.

The one or more policies may indicate that streaming media and other similar data should be rendered by the endpoint 205. For example, in one embodiment the policies may indicate that particular types of content data, such as animations, applications, audio, games, graphics, models, simulations, telephony, video, and web-based push-to-talk should be rendered by the endpoint 205. Or, in another embodiment, the policies may indicate that particular URLs should be rendered by the endpoint 205, for example URLs for video content servers (e.g., YouTube) or audio content servers (e.g., streaming radio stations), etc.

The browser servers 322, 362 (also called browser masters or browser services) and browser extensions 324, 364 may each be, for example, a software module or an element of a software module, and may be, for example, a stand-alone module, a part of another software module, or a combination of both. For example, the HVD browser server 322 and HVD browser extension 324 may each be individual software modules (as depicted in FIG. 2A), or may be combined together into a software module, or one or both may be combined together with host browser 320. Similarly, the endpoint browser server 362 and endpoint browser extension 364 may each be individual software modules (as depicted in FIG. 2A), or may be combined together into a software module, or one or both may be combined together with endpoint browser 360. Generally, when host browser 320 is instantiated, HVD browser extension 324 (if present) and HVD browser server 322 are also instantiated. In another embodiment, browsers 320, 360, may be implemented so that the functionality expressed by browser extensions 324, 364 is executed natively by the browsers (e.g., as depicted in FIG. 2B).

In one embodiment, an instance of endpoint browser 360 is created for each browser tab or browser window rendering a web page that policy determines should be rendered on the client endpoint device 205. However, because policy agent 40 may have determined that all current web pages should be rendered in HVD browser tabs and windows, it is possible that zero instances of endpoint browser 360 may be present on client endpoint device 205. In this case, endpoint browser server 362 should still be present, so that connection requests from HVD browser extension 324 may still be received, and so endpoint browser server 362 can create an instance of endpoint browser 360. Hence, for some embodiments, endpoint browser server 362 should be permanently resident on client endpoint device 205, even if the endpoint browser 360 is not yet instantiated. Then, when HVD browser extension 324 notifies endpoint browser server 362 to instantiate an endpoint browser 360 instance, the endpoint browser 360 generally instantiates the endpoint browser extension 364, and the HVD browser server 322 is instantiated as well.

The content transport session 380 is established directly between the endpoint browser 360 and the content server 30 or content cache server 35a-b. Thus, the content (e.g., media) data flows directly to client endpoint device 205, rather than flowing through the HVD 150 and thus requiring a very high bitrate from the VDI session 370. When the endpoint browser 360 decodes and renders the data, the rendered data is sent to client operating system 355 to be overlaid as a frameless browser window on the rest of the HVD display, which is being rendered by VDI client 350. The data transported by content transport session 380 may be encoded or compressed in any suitable fashion, and transmitted via any suitable protocol, for example HTTP, Microsoft Media Services (MMS), MPEG-Transport Stream (MPEG-TS), the Real-time Transport Protocol (RTP), User Datagram Protocol (UDP), or any other suitable protocol. In some embodiments, content server 30 or content cache server 35 are HTTP servers and therefore are functionally no differently from a web server 20.

The communication session 390 is established between endpoint browser server 362 and its opposing HVD browser extension 324 if present (as depicted in FIG. 2A), or if no browser extensions are present, with the opposing HVD browser 320 (as depicted in FIG. 2B). Similarly, communication session 385 is established between HVD browser server 322 and its opposing endpoint browser extension 364, if present (as depicted in FIG. 2A) or, if no browser extensions are present, with the opposing endpoint browser 360 (as depicted in FIG. 2B). If HVD browser server 322 is not present (as depicted in FIG. 2B), then communication session 385 is established between the HVD browser 320 and opposing endpoint browser extension 364, if present (as depicted in FIG. 2A) or, if no browser extensions are present, with the opposing endpoint browser 360. The communication sessions 385, 390 may be established using any suitable protocol, for example HTTP, TLS, TCP, or any other suitable protocol. In one embodiment, one or both of the communication sessions 385, 390 are multiplexed into a virtual channel transported by VDI session 370, and in another embodiment one or both of the communication sessions 385, 390 are transported independently from VDI session 370.

The communication sessions 385, 390 may comprise requests to load particular web pages, to instantiate a client endpoint browser 360 instance, to describe the location of one or more placeholder objects over which the endpoint browser 360 should render a particular frameless browser instance, to identify a URL describing the location of the content server 30, 35, to report changes to the page history of endpoint browser 360, and to display or hide browser tabs or browser windows.

As can be seen from FIG. 2 and the preceding description, the present embodiments provide an improved system architecture as compared to conventional systems delivering content to HVDs. In conventional systems, content such as streaming media is transported from content servers to a host device, where it is decoded and rendered by a browser in an HVD using a host plugin, e.g., an Adobe Flash plugin, before being re-encoded and transmitted to a client device over a VDI session. These conventional systems exhibit a number of disadvantages, such as high network loads, inefficient use of content cache servers, degraded HVD scalability due to increased computational load on host devices, etc.

As compared to conventional methods that route content such as media from content servers through the HVD and over a VDI session to the client endpoint, the present embodiments use the content transport session 380 to directly transport content data to the client endpoint 205 in certain circumstances, according to the system policies implemented by the policy agent 40. This direct transportation of content to client endpoint devices has several benefits. First, using the content transport session 380 consumes less network bandwidth because it can maintain the native encoding of the content server, rather than forcing it to be transcoded to conform to the encoding used by the VDI session 370. Second, use of the content transport session 380 allows for Quality of Service (QoS) differentiation between regular VDI services and content delivery services. Third, transmitting content data directly to the client endpoints avoids needless concentration of bandwidth at a centralized location such as a host device 105 where multiple HVDs may be located. Fourth, using the content transport session 380 avoids placing high computing loads (e.g., media decode/encode loads) on the HVD, and thus avoids scalability problems on the HVD devices. Fifth, because the VDI session 370, HTTP session 375, communication sessions 385, 390, and content transport session 380 may be separate from each other, different network paths may be used for VDI communication, remote procedure calls, and content transmission. Sixth, the transport of content directly to the client endpoint devices allows efficient usage of content cache server topology to reduce overall bandwidth across the network.

The various operating systems mentioned with reference to FIG. 1 and FIG. 2, such as the host operating system(s) 315 and the client operating system(s) 355 may be any suitable operating system for use in the VDI environment 100, such as, for example, a FreeBSD, Linux, OS X, UNIX, Windows, or other operating system. The operating system may be a standard operating system, an embedded operating system, or a real-time operating system. For example, the host operating system 315 may be a Linux operating system such as Ubuntu or Red Hat Enterprise Linux, a Mac operating system such as OS X or OS X Server, or a Windows operating system such as Windows 7 or Windows Server 2008 R2. The client operating system 355 may be, for example, a Blackberry, Linux, OS X, Windows, or other operating system. In one embodiment, the client operating system 355 is a flavor of Linux, such as Android, MeeGo, ThinStation, Ubuntu, webOS, or the like. In another embodiment, the client operating system 355 is an Apple operating system, such as OS X, iOS, or the like, or a Windows operating system, such as Windows 7, Windows CE, Windows Vista, Windows XP, or Windows XPe. It will be appreciated that the host browser 320 should be compatible with host operating system 315 and that the endpoint browser 360 should be compatible with client operating system 355. Hence, host browser 320 and endpoint browser 360 need not be the same browsers. As long as each browser is capable of rendering data from content server 30 or cache server 35, the user's experience of the rendering should be unaffected.

Figure 3A:
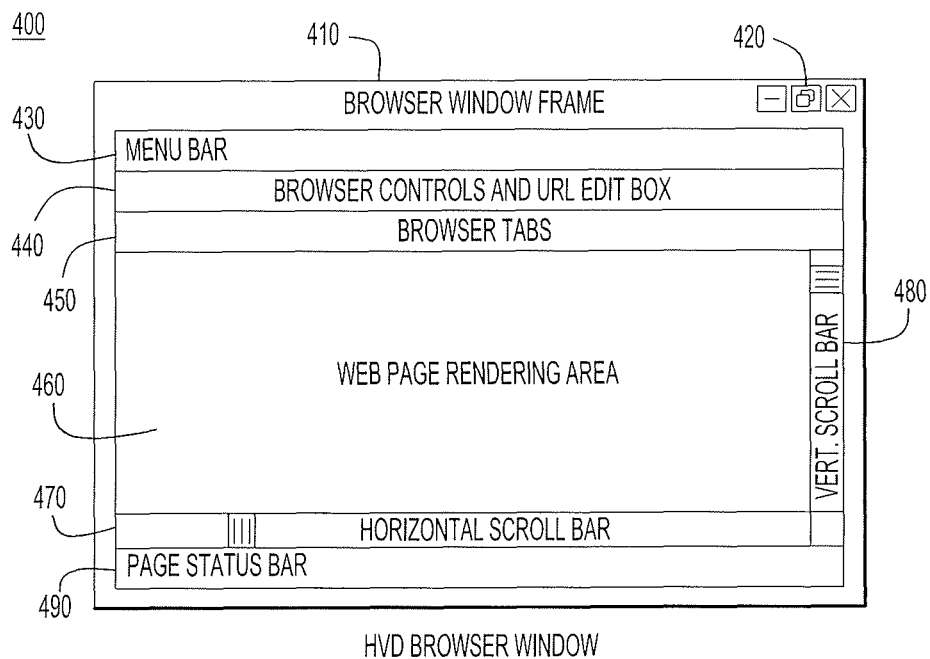
FIG. 3A is an example of a host browser window rendered by a hosted web browser including window elements rendered by the HVD.
Figure 3B:
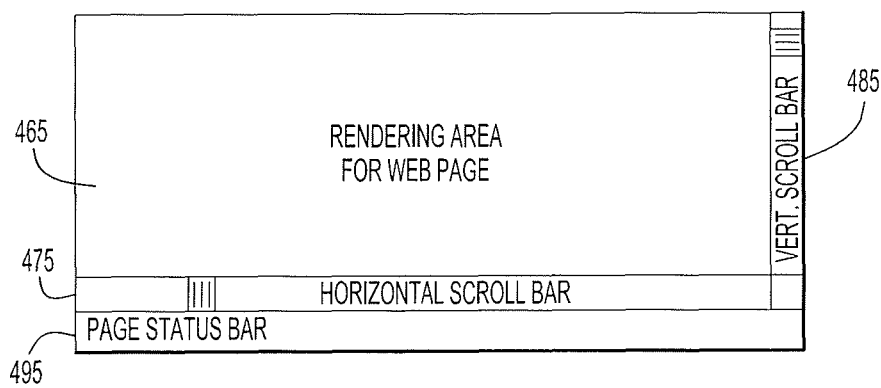
FIG. 3B is an example of a frameless client browser window rendered by a client endpoint device.
Figure 3C:
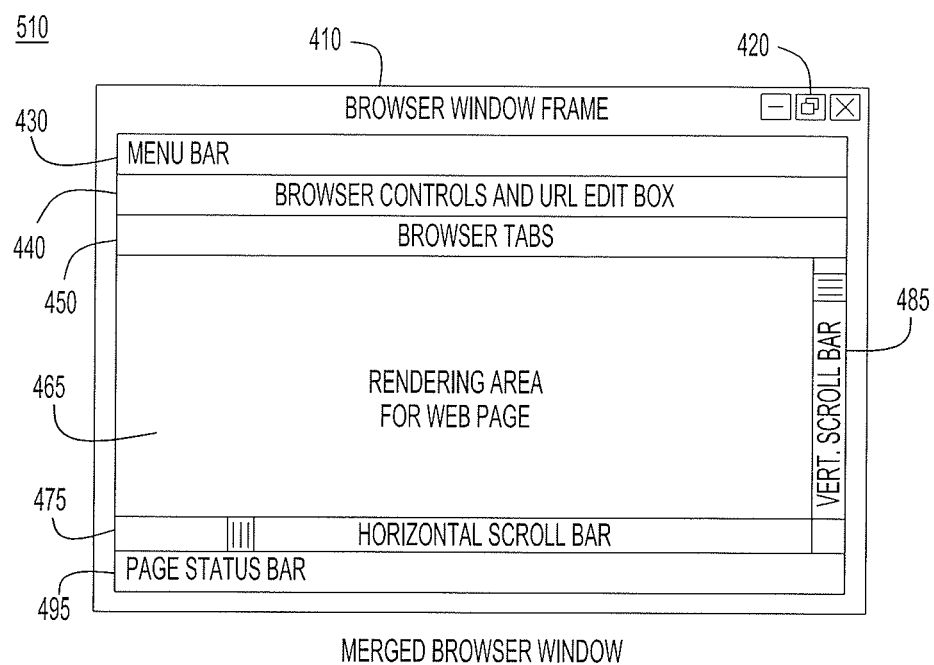
FIG. 3C is an example of a merged browser window, in which the frameless client browser window of FIG. 3B has been rendered as an overlay on the host browser window of FIG. 3A.

FIGS. 3A through 3C are examples of a host browser window 400, a frameless client browser window 535, and a merged browser window 510 in which the frameless client browser window of FIG. 3B has been rendered as an overlay on the host browser window of FIG. 3A. The host browser window 400 comprises a number of browser elements, for example in the depicted example the window 400 comprises a window frame 410 having window controls 420 to, e.g., minimize, restore, or close the window 400; a menu bar 430 displaying various browser commands (e.g., File, Edit, View, History, Bookmarks, Tools, Help, etc.); browser navigation controls 440 (e.g., forward and backward buttons, a home button, an edit box for manually entering URLs, etc.); and browser tabs area 450, which is displayed if multiple tabs, that is, multiple frames of rendered web pages, only one of which, the active tab, is displayed at a time, are active in the browser window and permits the user to create a tab, switch from tab-to-tab, close a tab, etc. Host browser window 400 also comprises a web page rendering area 460; horizontal and vertical scroll bars 470, 480, which are present if the content of the web page exceeds the current size of the rendering area, and a page status bar 490, which displays the execution state of the current page.

If a particular web page of the active tab is rendered by the host browser, then the host browser window 400 of FIG. 3A is displayed to a user of the client endpoint device 205. If, however, a particular web page is rendered by the endpoint, then an instance of the frameless client browser window 535, shown in FIG. 3B, is instantiated. The frameless client browser window 535 does not contain any of the window decorations or framing of host browser window 400, but does comprise a web page rendering area 465; horizontal and vertical scroll bars 475, 485, which are present if the content of the web page exceeds the current size of the rendering area, and a page status bar 495, which displays the execution state of the current page.

FIG. 3C depicts how the frameless client browser window 535 is overlaid or composited on top of the host browser window 400 as a merged browser window 510. As can be seen in the depicted example, the window decorations and framing elements 410 through 450 of host browser window 400 are composited with the rendering elements 465 through 495 of frameless client browser window 535 so that a unified browser window is displayed. In one embodiment, each instance of the frameless client browser window 535 has a single tab. If the host browser window 400 has multiple tabs open, the tabs may represent a mixture of web pages where some are rendered by the host (e.g., the HVD) and some are rendered by the endpoint 205. Each tab rendered by the endpoint 205 is represented by a separate instance of the frameless client browser 360, each of which is composited onto a separate tab in the host browser window 400. The compositing of the browser windows is further described with respect to FIG. 5.

Figure 4A:
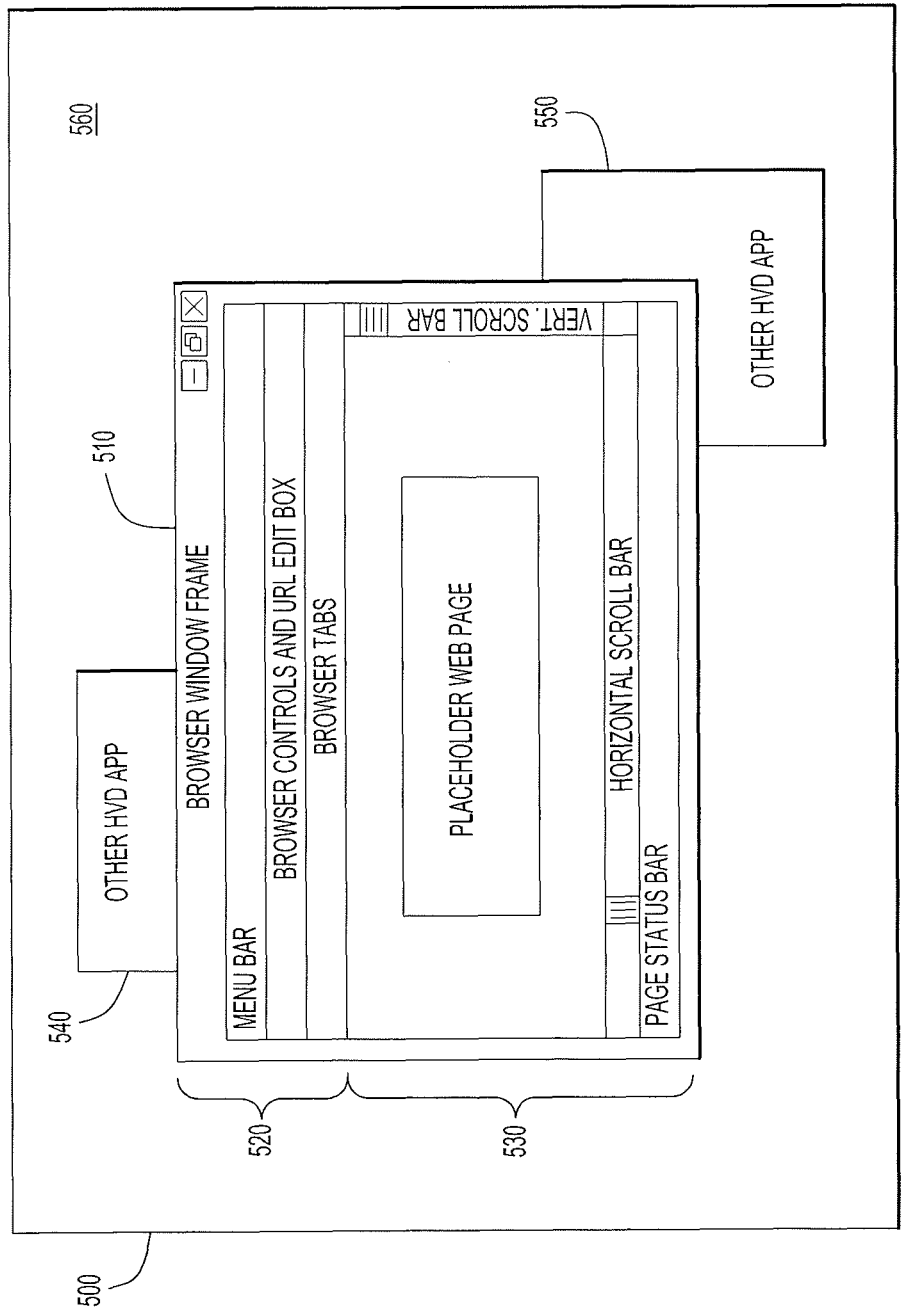
FIG. 4A is an example of a display including an HVD display comprising a host browser window rendered by a hosted web browser including window elements rendered by the HVD, and a placeholder for window elements to be rendered by the client endpoint device.
Figure 4B:
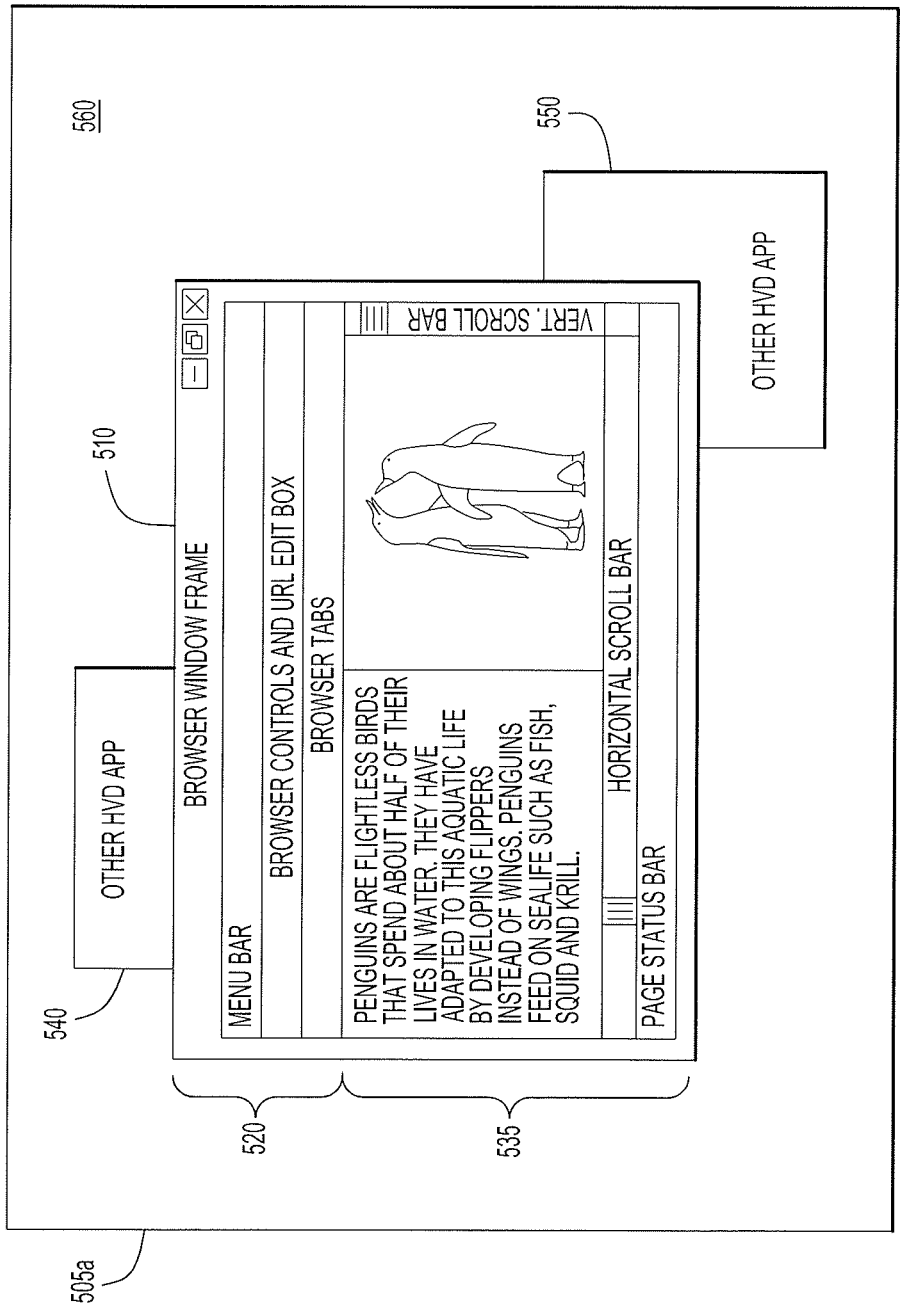
FIG. 4B is an example of a client display including a modified HVD display window in which the placeholder has been replaced with the frameless client browser window.
Figure 4C:
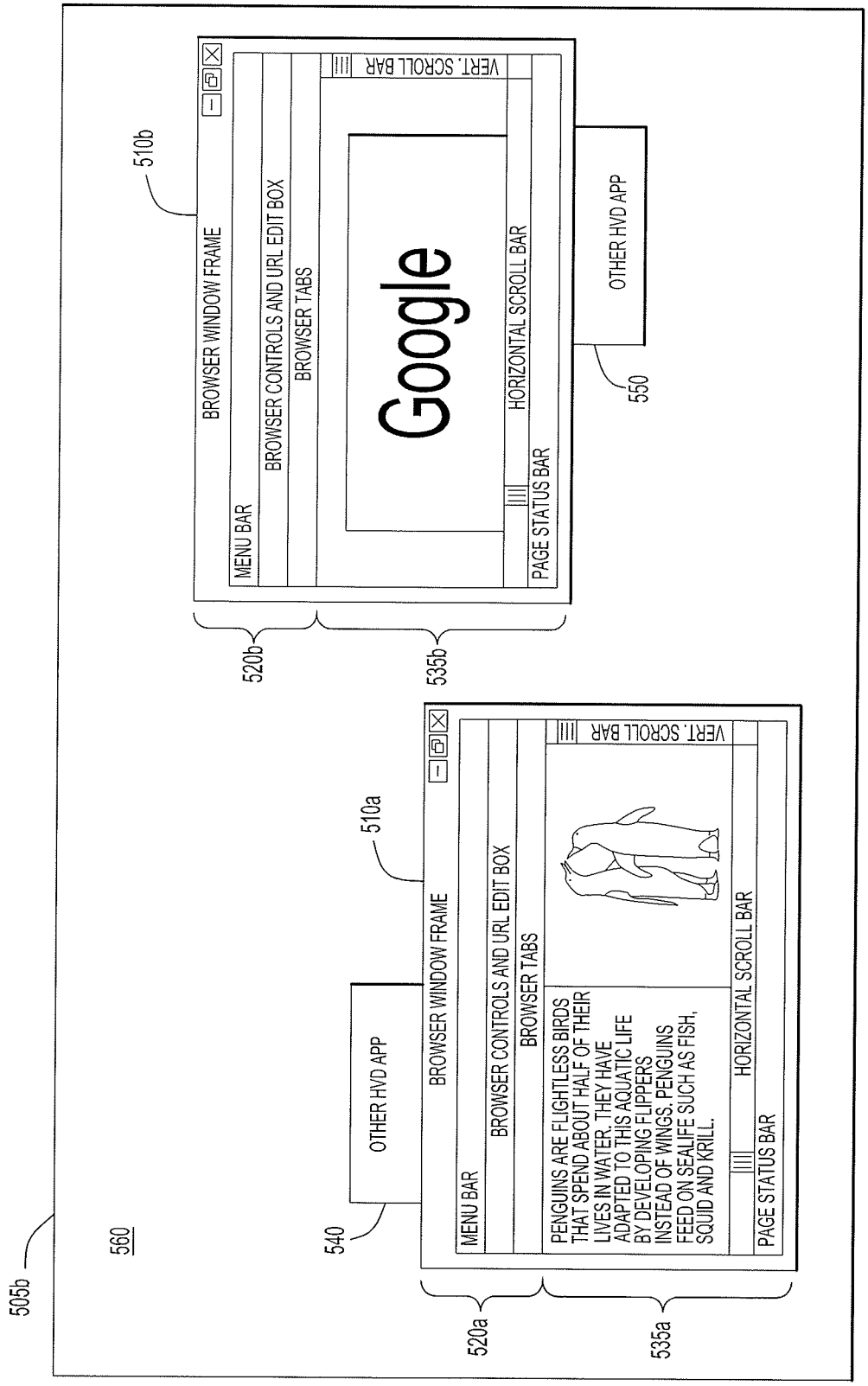
FIG. 4C is an example of a client display including a modified HVD display window and two browser windows, in each of which the placeholder has been replaced with a frameless client browser window.

FIG. 4A is an example of an HVD display 500, including HVD display of a browser window 510 and other HVD applications 540, 550, as rendered by the HVD, and FIGS. 4B and 4C are examples of an endpoint display 505, as modified and rendered by the client endpoint device for display to the user. It will be appreciated that HVD display 500 is a virtual display, and the depicted representations of the various elements in the display do not necessarily comprise a simple bitmap of the display. In a Microsoft Windows HVD, the GUI elements may be represented by Graphics Device Interface (GDI) drawing commands and/or Direct3D graphics commands. VDI server 310 may further process these representations to enable their transmission over VDI session 370.

In particular, FIG. 4A is an example of an HVD display 500 comprising a browser window 510 rendered by a hosted web browser, windows 540, 550 drawn by other HVD applications, and HVD background desktop image 560 which serves as the background image for the HVD display 500. The browser window 510 comprises host-provided window elements 520 (e.g., window decorations, framing elements, and controls 410 through 450 of host browser window 400 as shown in FIGS. 3A and 3C) and a placeholder element 530 for rendering elements (e.g., web page rendering area 460, scroll bars 470, 480 and page status bar 490). The placeholder element 530 acts as a placeholder where a client-rendered frameless browser window may be overlaid if a web page is rendered by the client endpoint device 205. Or, if the displayed web page is to be rendered by the HVD, the HVD may render the web page instead of the placeholder element 530, however such scenario is not depicted in FIG. 4. The HVD 150 may send the HVD display 500 including a placeholder element 530 over the VDI session 370. Information about the size and placement of placeholder element 530 for a client-provided frameless browser window may be sent over the communication session 390, for example placeholder information such as the position of the placeholder in the browser window, the size of the placeholder, and a description of regions of the placeholder that are occluded by other HVD applications in the HVD display.

FIG. 4B is an example of a display 505a including a modified HVD display for display by the client endpoint device 205, in which the placeholder element 530 has been replaced by a client-provided frameless browser window 535, which is rendered by endpoint 205. The visual replacement of the placeholder with the client-rendered frameless window 535 may be accomplished in several ways. For example, the client endpoint device 205 may render the frameless browser window 535 over the placeholder portion 530 of the display 505a, or it may render the frameless browser window 535 first and render display 505a over the frameless browser window 535 with a "hole" in the display 505a where the frameless browser window 535 is located, or in any other suitable fashion to provide the appearance of an integrated display.

In the depicted example, the frameless browser window 535 is a frameless window displaying a web page that may comprise media data such as video data (e.g., CCTV, H264, mp4, QuickTime, etc.), but may also be any other type of data, such as Flash, JavaScript, or Silverlight. Furthermore, users may interact directly with the frameless browser window 535 using endpoint input devices such as a mouse or keyboard, rather than interacting with the HVD through the VDI session 370. Such interaction may occur when it is determined that the frameless browser window has been granted focus, i.e. when the operating system determines that user input should be directed at a web page rendered by the client endpoint 205.

FIG. 4C is an example of a display 505b including a modified HVD display for display by the client endpoint device 205, in which there are two browser windows 510a, 510b. In each browser window 510a, 510b, the placeholder element 530 has been replaced by a client-provided frameless browser window 535a, 535b, which is rendered by endpoint 205. Each browser window 510a, 510b also comprises host-provided window elements 520a, 520b. In this example, each frameless browser window 535a, 535b is rendered by a different instance of the frameless client browser 360. Browser window 510b may be created explicitly by the user launching a second HVD browser, by the user requesting that an anchor be rendered in a separate window, or by the user clicking on an anchor (e.g., a link) that specifies that the URL should be rendered in a separate window. It will be understood that, in some configurations, the HVD framing 520b may be reduced from the framing 520a that was provided for browser window 510a, for example, a browser window may be created with minimal window framing 410, 420 and no menu bar 430, browser controls, 440, or browser tabs 450.

Although the depicted examples are of visual display elements, it will be understood that a similar compositing process takes place for audio. Client endpoint device 205 may receive audio, comprising, for example, application tones, music, voice, or alerts, from HVD 150, via VDI session 370. Client endpoint device 205 may also receive audio content from a content server 30/35, via content transport session 380. Client endpoint device 205 should combine the audio from these two sources and render a coherent audio waveform to speakers 270. The two sources may, for example, be mixed by operating system 355, using audio rendering hardware in client endpoint device 205.

Figure 5:
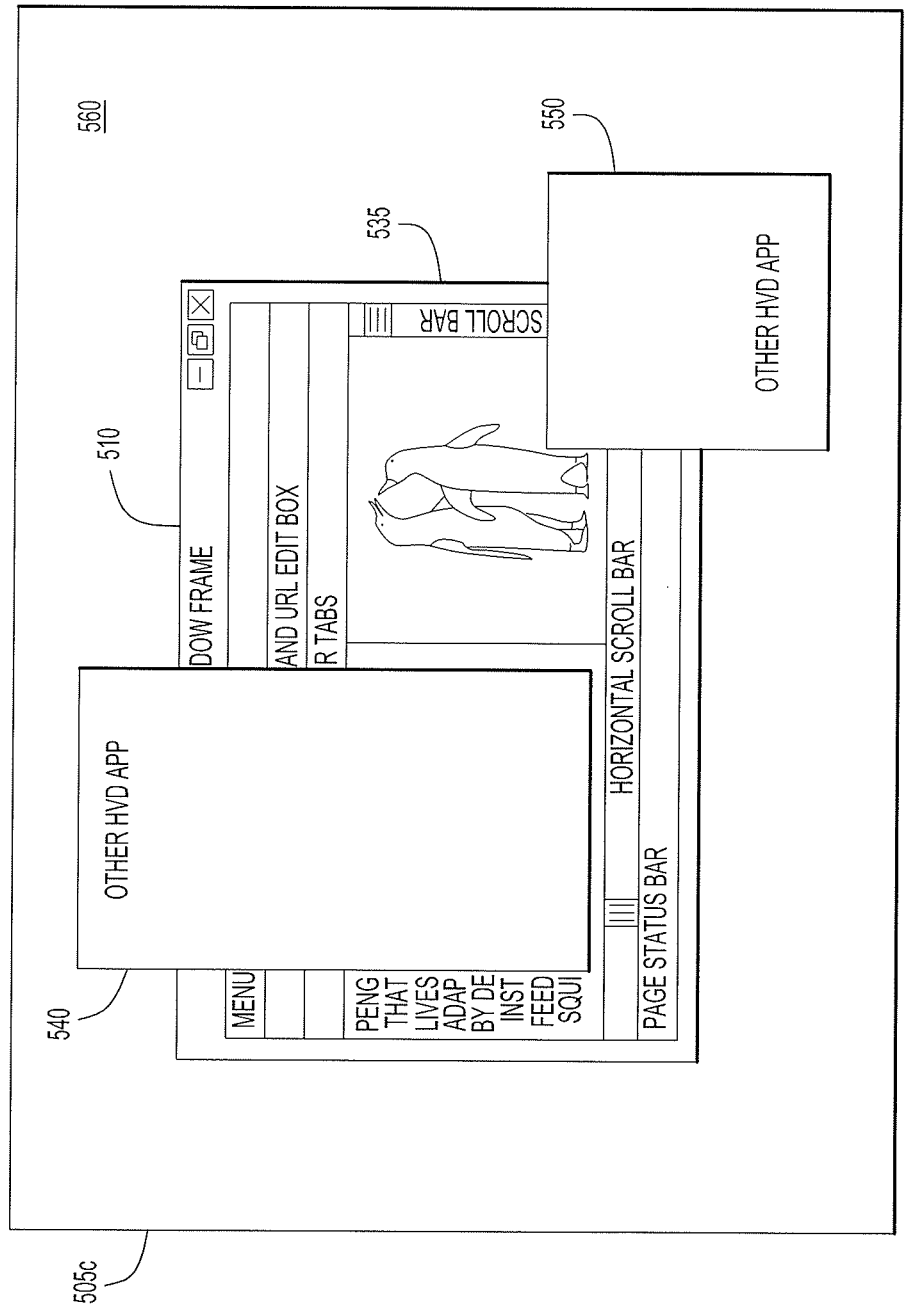
FIG. 5 is an example of a display in which the client endpoint device displays the composited HVD display and client-rendered content of the browser window as partially occluded by windows of other HVD applications.

FIG. 5 is an example of a modified HVD display 505c in which the client endpoint device 205 displays a composite of the HVD display comprising a browser window 510 as well as windows 540, 550 drawn by other HVD applications. In FIG. 5, the application windows 540, 550 have been brought to the foreground of the display through recent user interaction, and now partially occlude the browser window 510, even though portions of browser window 510 are being rendered on the client endpoint device 205 using the endpoint browser 360. Because the VDI server 310 may composite all applications on the HVD 150 into a single HVD display, which is then communicated to the client endpoint device 205, placeholder element 530 may not be a simple rectangle, implying that the compositing of client-provided frameless browser window 535 cannot be accomplished by requesting that client operating system 355 render a simple rectangle on top of the HVD display, as was the case in FIG. 4B. Because the client endpoint device 205 is responsible for rendering both the HVD display 505 and the client-provided frameless browser window 535, the ability of the client endpoint to render the complete display depends on multiple factors including the client operating system 355, the display rendering hardware 240, and the like.

In particular, it is the responsibility of the client operating system 355 to accomplish compositing. In most windowed operating systems, compositing is accomplished by the operating system drawing each individual window according to a z-order, which describes the relative depth of the various windows. Windows with the deepest (lowest) z-order are drawn first, and each window with a successively shallower (higher) z-order is drawn subsequently, which may result in the deeper windows being partially or fully occluded on the display. The assignment of higher-valued integers to shallower windows is somewhat arbitrary, but higher z-order shall herein be understood to imply shallower windows, i.e., windows stacked closer to the user's eyes. For example, if the host browser window 510 is from an HVD 150, then the frameless client browser window 535 will have a higher z-order than the window used to render the HVD display 405b. If the host browser window 510 is from a hosted virtual application (HVA), then the frameless client browser window 535 will have a higher z-order than that of the window used to render the HVA display (e.g., the host browser window 510) but lower than that of any HVA windows or endpoint application windows that may fully or partially occlude the HVA display.

It should be appreciated, however, that the VDI client 350 may receive all virtual display information (i.e., the HVD display comprising browser window 510 with host-provided window elements 520 and placeholder element 530, other HVD application windows 540, 550, and the HVD background desktop image 560) from VDI session 370 and may request the client operating system 355 to render the entire virtual display as a single rectangular window. Thus, although window 540 or 550 may have a higher z-order on the HVD than the browser window 510, the client endpoint device 205 may composite the frameless client browser window 535 so that the composited images have a higher z-order than the HVD display.

The client endpoint device 205 creates the appearance that frameless client browser window 535 is partially occluded, however, by rendering either the frameless client browser window 535 or the remainder of display 505a as non-rectangular shapes. For example, the client endpoint device 205 may composite the frameless client browser window 535 in only the non-occluded portions of the placeholder element 530. This means that the frameless client browser window 535 may be rendered as a non-rectangular shape, for example the irregular octagonal shape shown in FIG. 5 that results from the occlusion of the lower right corner by the window 550 and upper left corner by window 540. Alternatively, the client endpoint device 205 may render the frameless client browser window 535 as a rectangular shape, and render the remainder of display 505a with a non-rectangular "hole" over the portion of the frameless client browser window 535 desired to be displayed.

To efficiently render display 505a, the client operating system 355 should be able to accept requests to render non-rectangular images without interfering with the images on the rest of the display. The endpoint browser server 362 should therefore be able to be informed of the non-rectangular geometry, so that this information may be communicated to the operating system 355. In one example, the HVD browser extension 324 interacts with HVD operating system 315 to compute the geometry of the non-occluded portions of the placeholder window and communicates that window geometry information to the endpoint browser server 362 over the communication session 390. In another example, HVD browser extension 324 fills placeholder element 530 with a placeholder image, for example a low bandwidth image such as a monochrome page, so that endpoint browser server 362 and operating system 355 may compute the non-rectangular region by detecting what portions of the virtual display contain the placeholder image. Operating system 355 should also be able to render the non-rectangular images at high speed and at a low impact to the CPU of the client endpoint device 205. In one example of such an efficient rendering, operating system 355 is aware of display rendering hardware 240, which comprises, for example, a graphics processing unit (GPU) capable of rendering non-rectangular images.

FIGS. 6 and 7 illustrate examples of the inter-connected operational processes 600 and 700 of the host browser extension 324 at the HVD (FIG. 6) and the endpoint browser server 362 at the client endpoint device 205 (FIG. 7), respectively. These processes 600 and 700 are carried out by the host browser extension 324 and the endpoint browser server 362, respectively, and are inter-related. It may be seen, for example, that the HVD browser extension sends a message to the endpoint browser server in step 626, and that the endpoint browser server responds to the received messages by taking various actions, for example by creating a browser instance in steps 718-724. The messages exchanged in processes 600 and 700 may be remote procedure calls (RPCs) or any other suitable messages. If there is no host browser extension 324 present in a particular embodiment (e.g., the example of FIG. 2B), then process 600 is performed by one or both of the host browser 320 and the host browser server 322, and the references to the host browser extension in the following description are understood to refer to the browser component actually performing process 600.

Although not depicted here, it is understood that processes 600, 700 operate in conjunction with the host sending an HVD display image 500 from the HVD to the client endpoint, where the HVD display comprises at least one placeholder element 530, as previously described with respect to FIG. 2. The client endpoint device 205 may receive the HVD display image via VDI client 350 and the VDI session 370. The HVD display image may be transported as a single window comprising the entire HVD display image, or as a separate virtual image for each hosted virtual application, or a combination of the two.

Figure 6A:
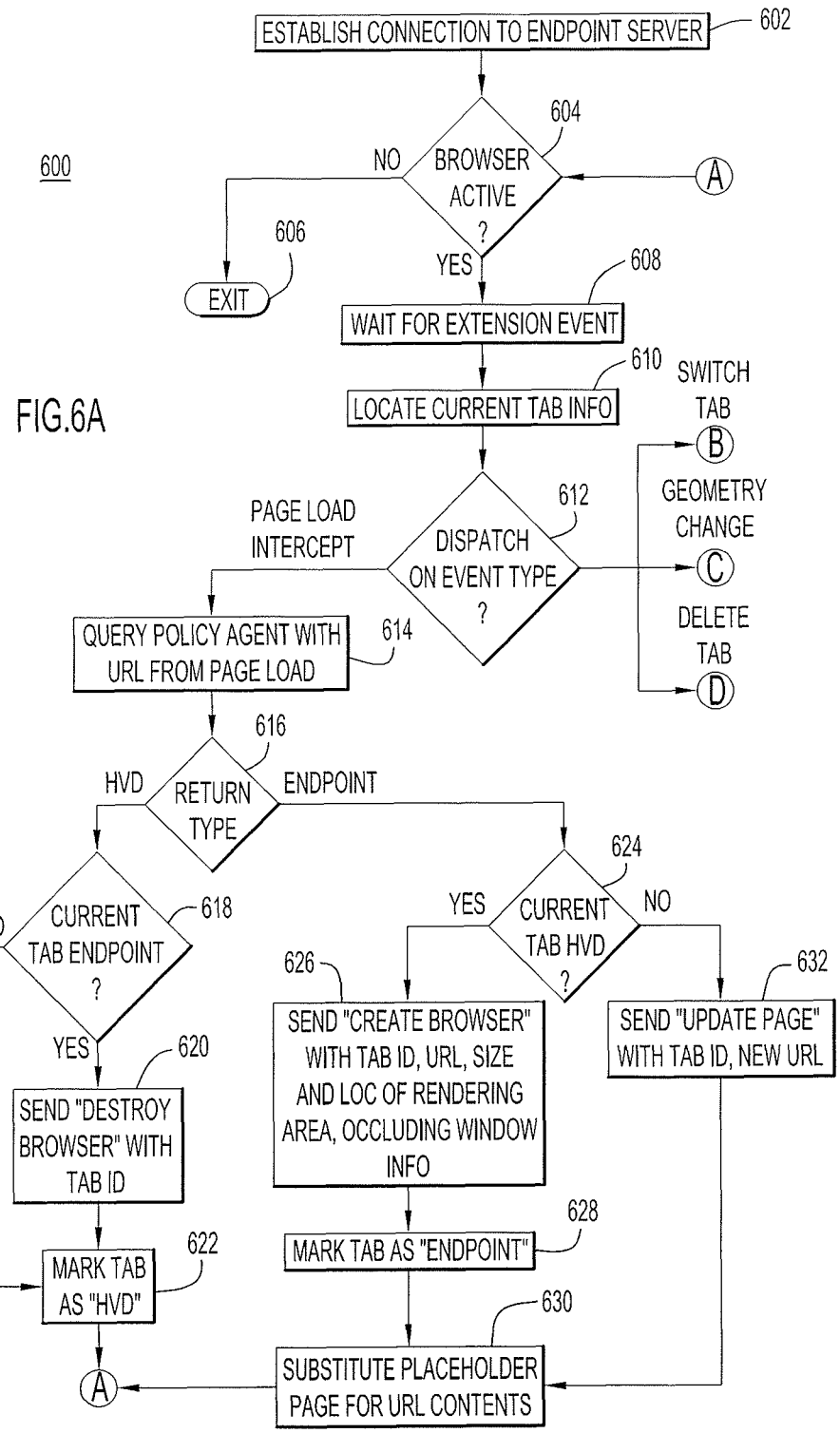
FIGS. 6A and 6B are an example of a flow chart generally depicting operation of a host browser extension at the HVD.
Figure 6B:
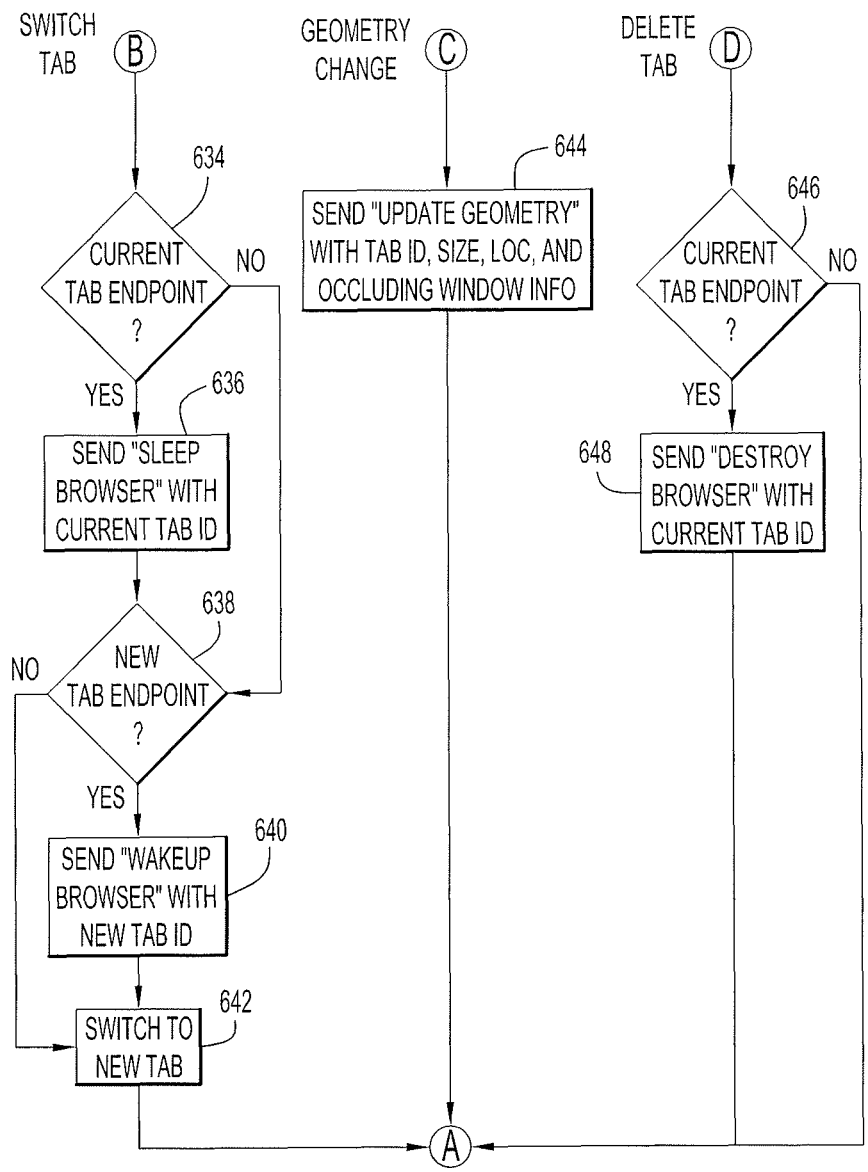

Referring now to FIGS. 6A and 6B, process 600 starts in step 602 by the HVD browser extension 324 establishing a communication session 390 to the endpoint browser server 362, which may take many embodiments, including, but not limited to, use of HTTP, TLS, TCP, or multiplexing onto a virtual channel of VDI session 370. In step 604 the HVD browser extension determines if the host web browser 320 is active. If not, the process 600 ends at step 606, e.g., by terminating process 600 or returning to wait for the browser to become active, but if yes, then in step 608 the HVD browser extension waits to receive an event from the browser. An event may be generated by user interactions with the web page, or scripting associated with the web page, or callback requests from the client endpoint device 205.

When an event is received, the HVD browser extension proceeds to step 610, where it locates the current tab information, that is, information about the tab currently active in the HVD browser. The tab information is maintained by the HVD and endpoint browser servers 322, 362 and the HVD and endpoint browser extensions 324, 364, and may be in any suitable form, for example a list of tab information structures keyed by tab identifiers. The tab information is passed back and forth in the messages sent between each browser server 322, 362 and its respective browser extension 324, 364. For the endpoint browser server 362, the tab information points at the instance of the endpoint browser 360 that is currently in use for this particular tab. For HVD browser extension 324, the tab information maintains a marker indicating whether the current tab is being rendered by the HVD or the endpoint.

In step 612 the HVD browser extension determines the type of event received in step 608, and processes the event according to a particular path before returning to step 604. FIG. 6 presents a few examples of common events that may occur in the same or similar form in many conventional web browsers, and it is understood that the depicted events may be modified or varied from those depicted. The depicted events include page load intercepts, tab switching, geometry changes, and tab deletion.

A page load intercept event is received when the browser is loading a new page, which may result from user actions such as clicking a link in the current page, requesting a bookmarked page, requesting a page from the browser history, using the navigation controls (e.g., a forward or back button), typing a URL in an address bar, etc. For a page load intercept event, the HVD browser extension in step 614 queries the policy agent with the URL of the page desired to be loaded, and in 616 determines whether the policy agent specified whether the HVD or the endpoint should render the new page. If the HVD should render the new page, then the HVD browser extension in step 618 checks to determine if the currently active tab is being rendered by the endpoint, if yes, in step 620 sends a "destroy browser" message containing the current tab identifier to the endpoint browser server 362 and proceeds to step 622, and if not, proceeds to step 622. In step 622, the HVD browser extension marks the new tab as rendered by the HVD, and returns to step 604.

If the endpoint should render the new page, then the HVD browser extension in step 624 checks to determine if the currently active tab is being rendered by the HVD, and if yes, in step 626 sends a "create browser" message containing the new tab identifier to the endpoint browser server 362. The "create browser" message also contains the new URL, and information about the size and location of the placeholder element 530, occluding window(s), etc. In step 628, the HVD browser extension marks the new tab as rendered by the endpoint, and in step 630 substitutes a page containing placeholder element 530 for the currently displayed web page, and returns to step 604. If the determination in step 624 is no, then the HVD browser extension in step 632 sends an "update page" message containing the current tab identifier and the new URL to the endpoint browser server 362, and proceeds to step 630.

Turning to events processed in FIG. 6B, a switch tab event is an event when the browser switches from the current tab to a different active tab in the browser, which may result from user actions such as clicking on a different tab or using navigation controls to move from tab to tab. For a switch tab event, the HVD browser extension in step 634 determines if the current tab is being rendered by the endpoint, if yes proceeds to step 636 and if no proceeds to step 638. In step 636, the HVD browser extension sends a "sleep browser" message containing the current tab identifier to the endpoint browser server 362, and proceeds to step 638. In step 638, the HVD browser extension determines if the new tab should be rendered by the endpoint, if yes proceeds to step 640 and if no proceeds to step 642. In step 640, the HVD browser extension sends a "wakeup browser" message containing the new tab identifier to the endpoint browser server 362, and proceeds to step 642. In step 642, the HVD browser extension switches to the new tab, and returns to step 604.

A geometry change event is an event when the browser window 510 or other application windows 540, 550 are altered, for example moved to a different location in the HVD display, altered in size, occluded by another window, etc., which may result from user actions such as clicking on different application windows, using keyboard navigation commands to move from application window-to-window, moving or resizing one or more windows, etc. For a geometry change event, the HVD browser extension in step 644 sends an "update geometry" message to the endpoint browser server 362, which contains the current tab identifier, the window geometry, which may comprise window coordinates and size for the frameless client browser window 535, and information about what sections of the frameless client browser window 535 are occluded, etc. The HVD browser extension then returns to step 604.

A delete tab event is an event when a tab in the browser is closed, which may result from user actions such as clicking on a "tab close" control, etc. For a delete tab event, the HVD browser extension in step 646 determines if the current tab is being rendered by the endpoint, if yes proceeds to step 648 and if no returns to step 604 (because the host web browser will delete the tab). In step 648, the HVD browser extension sends a "destroy browser" message containing the current tab identifier to the endpoint browser server 362, and returns to step 604.

Figure 7A:
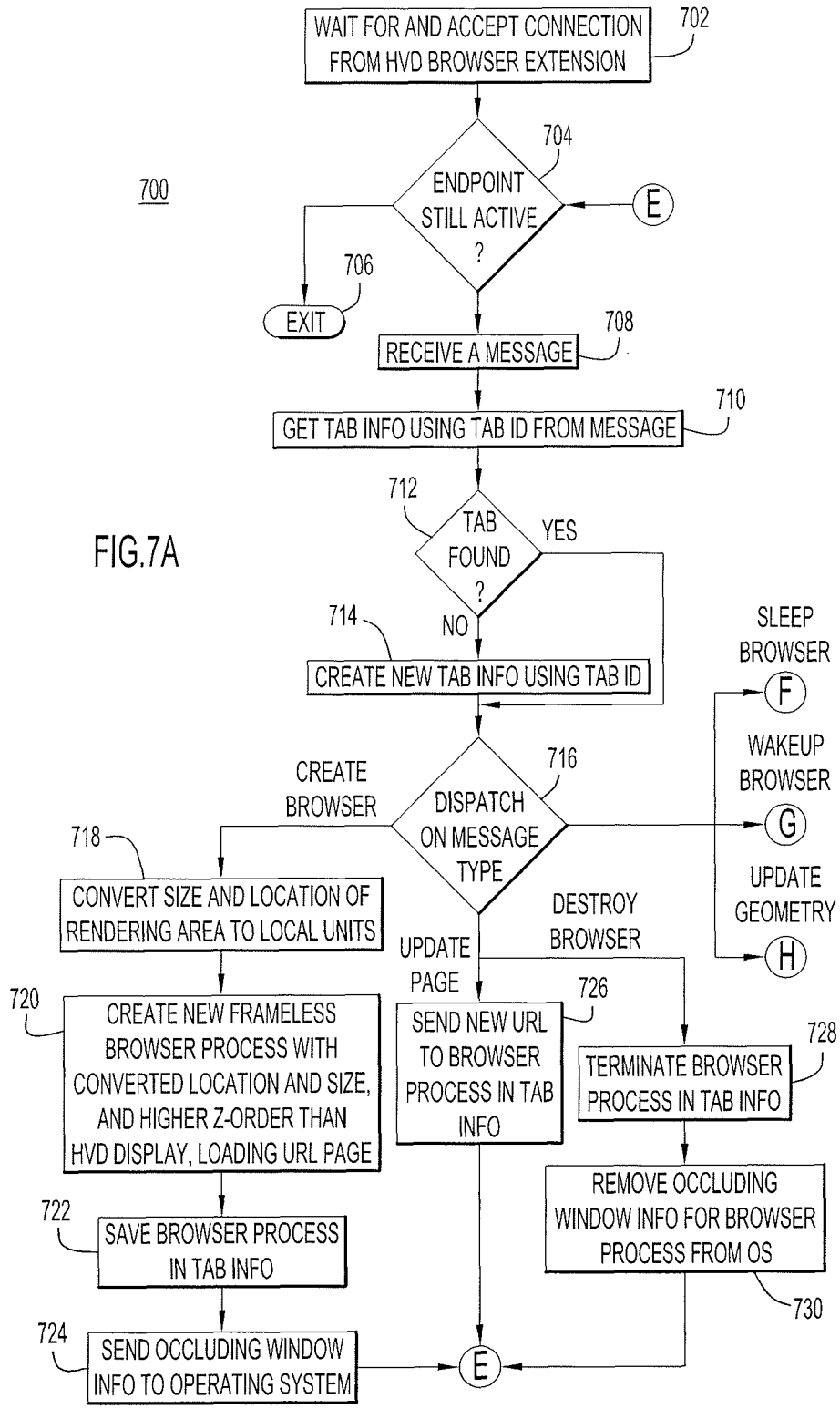
FIGS. 7A and 7B are an example of a flow chart generally depicting operation of an endpoint browser server at the client endpoint device.
Figure 7B:
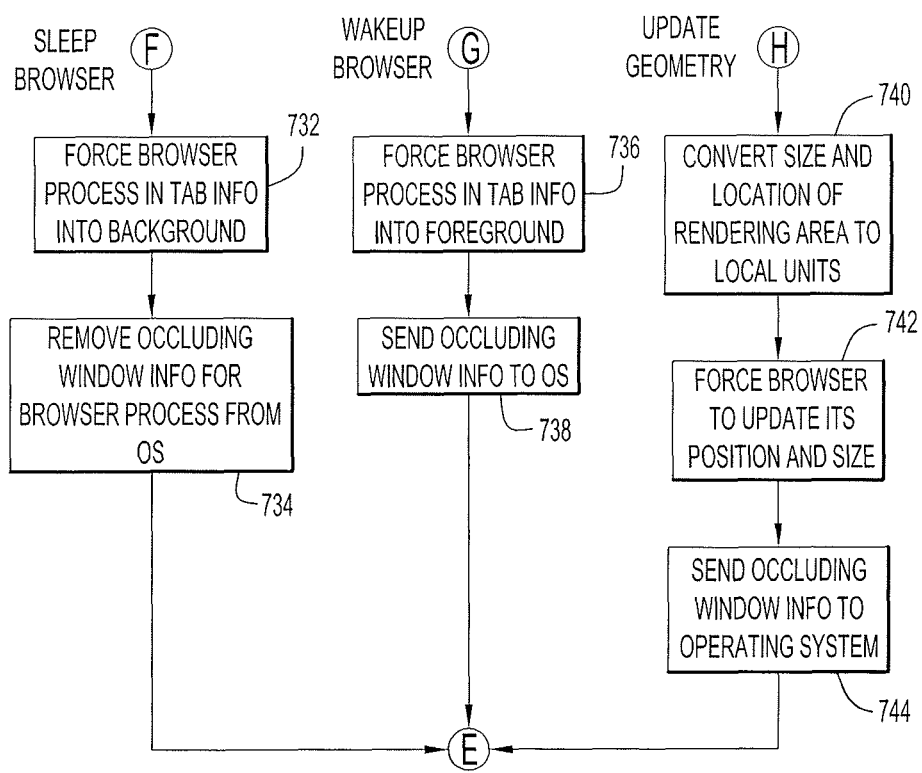

Referring now to FIGS. 7A and 7B, endpoint server process 700 starts in step 702 by the endpoint browser server 362 waiting for and accepting the establishment of communication session 390 by the HVD browser extension. It will be understood that, even if no endpoint browser instances 360 are currently active, process 700 should still be active to listen for incoming connection requests from HVD browser extensions 324. In one embodiment, process 700 is started as part of the bootstrap process for client endpoint device 205, and remains active throughout the period that client endpoint device 205 is operational. In step 704 the endpoint browser server determines if the endpoint device 205 is active, e.g., is connected to a host via a VDI session, etc. If not, the process 700 ends at step 706, e.g., by terminating process 700 or returning to wait for the endpoint device 205 to become active, but if yes, then in step 708 the endpoint browser server waits to receive a message from the HVD browser extension, for example one of the messages sent by HVD extension process 600. When a message is received, the endpoint browser server proceeds to step 710, where it locates the tab information based on the tab identifier in the message. In step 712 the endpoint browser server looks for the identified tab, and if none is found, creates new tab information using the received tab identifier in step 714, before proceeding to step 716. If the identified tab is found, then the endpoint browser server proceeds to step 716. In step 716, the endpoint browser server processes the received message according to its type, before returning to step 704.

For a "create browser" message, the endpoint browser server in step 718 converts the window coordinates and size contained in the message to coordinates suitable for the display 250 associated with client endpoint device 205. In step 720, the endpoint browser server creates a new instance of the endpoint browser 360, which renders the new URL in a frameless browser window 535, that is, a drawing rectangle or a window with no framing decorations associated with it, as specified according to the received message. The frameless browser window 535 has a higher z-order than the HVD browser window 510, which in turn may be a portion of, for example, HVD display 500 (separately received by the client endpoint device 205, for example via VDI session 370). In step 722 the endpoint browser server saves the frameless browser instance reference (in some embodiments, a process or thread identifier) in the tab information, thereby forming an association between the tab identifier and the browser instance reference, and in step 724 sends information about regions of the HVD display that occlude the frameless browser window 535 to the endpoint operating system 355. In sum, the drawing rectangle and occlusion information allows endpoint browser server 362 to interact with operating system 355 to display only those portions of the rendered data that are currently visible in the HVD display, resulting in a endpoint display similar to those depicted in FIGS. 4B and 5 as elements 505a or 505c. The endpoint browser server then returns to step 704.

For an "update page" message, the endpoint browser server in step 726 sends the new URL to the endpoint browser instance associated with the received tab identifier, and returns to step 704. For a "destroy browser" message, the endpoint browser server in step 728 terminates the endpoint browser instance associated with the received tab identifier, and in step 730 removes the occluding window information for this browser instance from the endpoint operating system 355, and returns to step 704. Turning now to FIG. 7A, for a "sleep browser" message, the endpoint browser server in step 732 forces the endpoint browser instance associated with the received tab identifier into the background, where it stops rendering data and remains minimized ("asleep"). In step 734 the endpoint browser server removes the occluding window information for this browser instance from the endpoint operating system 355, and returns to step 704.

For a "wakeup browser" message, the endpoint browser server in step 736 restores the endpoint browser instance associated with the received tab identifier into the foreground, causing it to recommence rendering data on the endpoint display, and in step 738 sends information about occluding regions of the HVD display to the endpoint operating system 355. The endpoint browser server then returns to step 704. For an "update geometry" message, the endpoint browser server in step 740 converts the window coordinates and size contained in the message to coordinates suitable for the display 250 associated with client endpoint device 205, and in step 742 forces the endpoint browser instance associated with the received tab identifier to update its position and size. In step 744 the endpoint browser server sends information about occluding regions of the HVD display to the endpoint operating system 355, and returns to step 704.

Figure 8A:
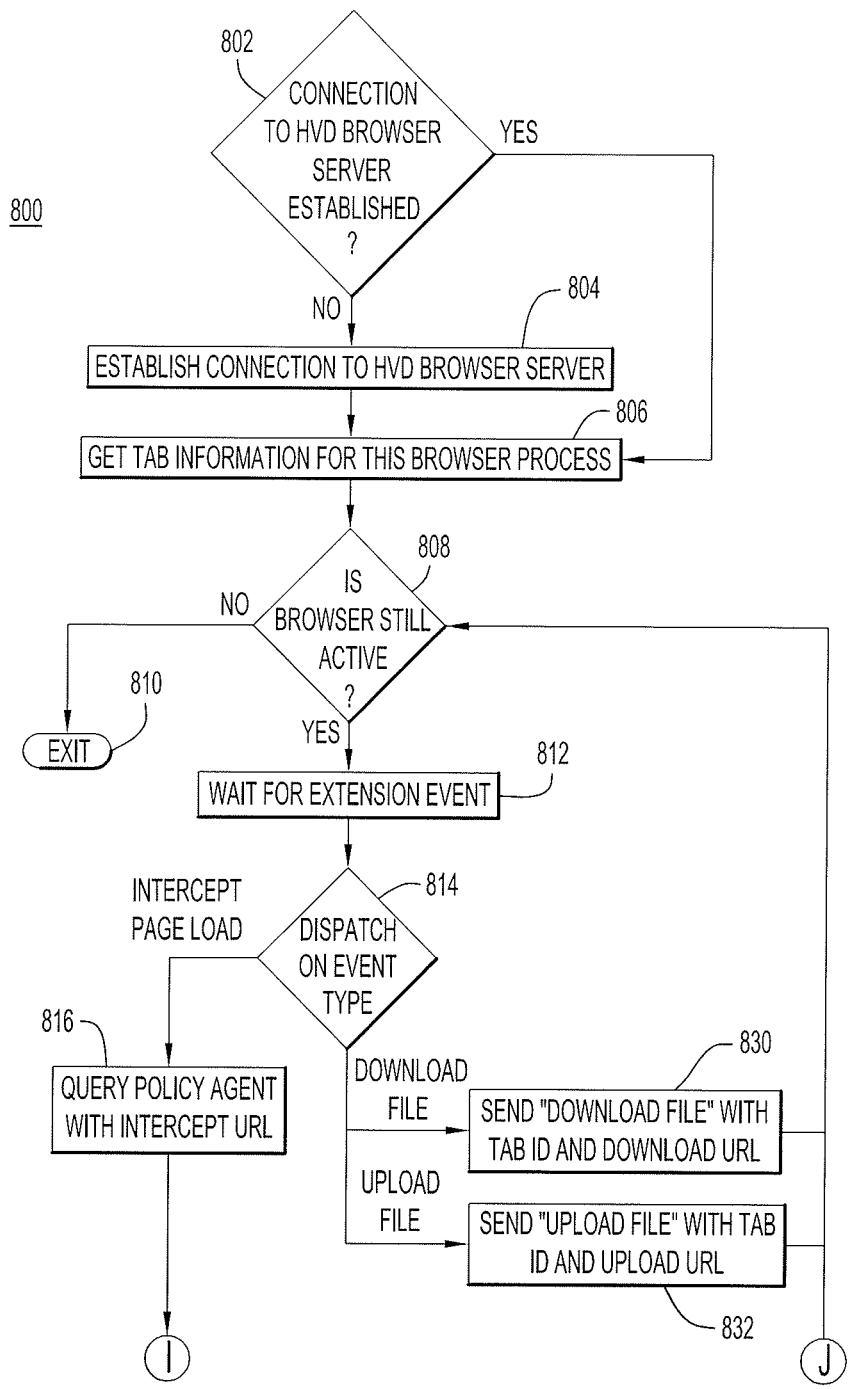
FIGS. 8A and 8B are an example of a flow chart generally depicting operation of an endpoint browser extension at the client endpoint device.
Figure 8B:
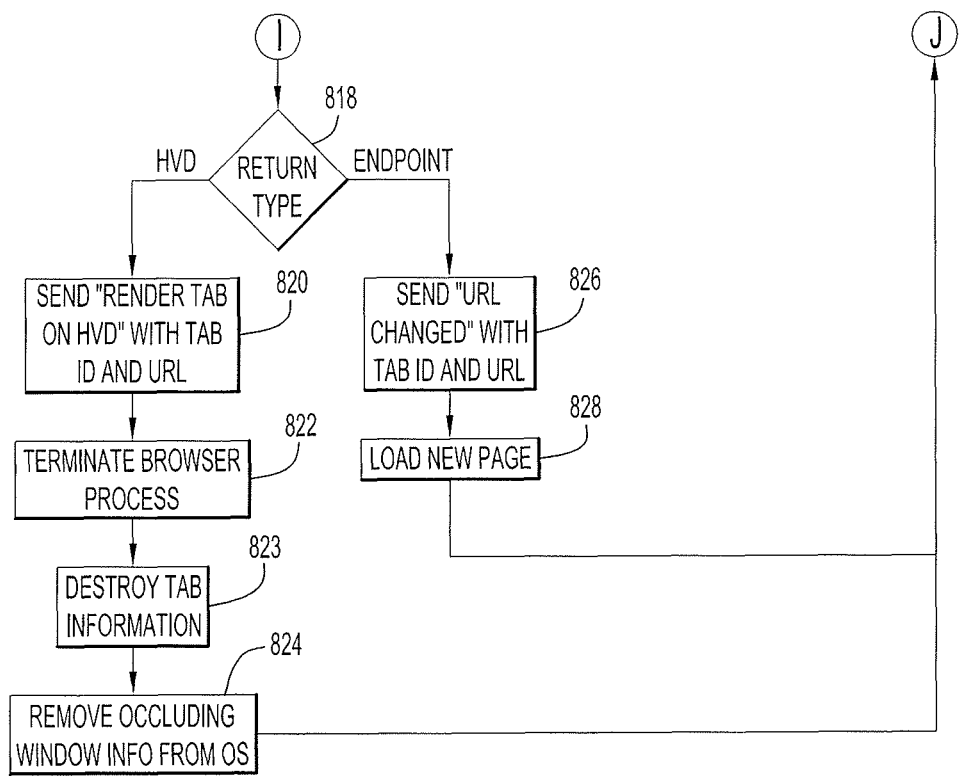

FIGS. 8 and 9 illustrate examples of the inter-connected operational processes 800 and 900 of the endpoint browser extension 364 at the client endpoint device 205 (FIGS. 8A and 8B) and the HVD browser server 322 at the HVD (FIG. 9), respectively. These processes 800 and 900 are carried out by the endpoint browser extension 364 and the HVD browser server 322, respectively, and are inter-related. It may be seen, for example, that the endpoint browser extension sends a message to the HVD browser server in step 818, and that the HVD browser server responds to the received message by taking various actions, for example by rendering a tab in step 914. The messages exchanged in processes 800 and 900 may be remote procedure calls (RPCs) or any other suitable messages. If there is no endpoint browser extension 364 present in a particular embodiment (e.g., the example of FIG. 2B), then process 800 is performed by one or both of the endpoint browser 360 and the endpoint browser server 362, and the references to the endpoint browser extension in the following description are understood to refer to the browser component actually performing process 800. Similarly, if there is no HVD browser server 322 present in a particular embodiment (e.g., the example of FIG. 2B), then process 900 is performed by one or both of the HVD browser 320 and the HVD browser extension 324 (if present), and the references to the HVD browser server in the following description are understood to refer to the browser component actually performing process 900.

Although not depicted here, it is understood that processes 800 and 900 operate in conjunction with the host sending an HVD display image 500 from the HVD to the client endpoint, where the HVD display comprises at least one placeholder element 530, as previously described with respect to FIG. 2. The client endpoint device 205 may receive the HVD display image via VDI client 350 and the VDI session 370. The HVD display image may be transported as a single window comprising the entire HVD display image, or as a separate virtual image for each hosted virtual application, or a combination of the two. The processes 800 and 900 may also run concurrently with processes 600 and 700. It should be noted that because multiple instances of frameless client browser 360 may be active at the same time, there may be multiple processes 800 also active at the same time, each process 800 being associated with a particular instance of frameless client browser 360.

Referring now to FIGS. 8A and 8B, process 800 starts in step 802 by the endpoint browser extension 364 determining if a communication session 385 with the HVD browser server 322 has been established, and if no proceeding to step 804 and if yes proceeding to step 806. In step 804, the endpoint browser extension establishes communication session 385 to the HVD browser server 322, which may take many embodiments, including, but not limited to, use of HTTP, TLS, TCP, or multiplexing onto a virtual channel of VDI session 370. In step 806, the endpoint browser extension obtains the tab information for the browser instance associated with the current process, for example by querying the endpoint browser server 362. In step 808 the endpoint browser extension determines if its associated browser instance is active. If not, the process 800 ends at step 810, e.g., by terminating process 800 or returning to wait for the browser instance to become active, but if yes, then in step 812 the HVD browser extension waits to receive an event from the browser. An event may be generated by user interactions with the web page, or scripting associated with the web page, or requests from the HVD.

In step 814 the endpoint browser extension determines the type of the received event, and processes it according to a particular path before returning to step 804. FIGS. 8A and 8B present a few examples of common events that may occur in the same or similar form in many conventional web browsers, and it is understood that the depicted events may be modified or varied from those depicted. The depicted events include page load intercepts, downloading files and uploading files.

For a page load intercept event, the endpoint browser extension in step 816 queries the policy agent with the URL of the intercept page desired to be loaded, and in step 818, determines whether the response from the policy specifies whether the HVD or the endpoint should render the new page. If the HVD should render the new page, then the endpoint browser extension in step 820 sends a "render tab on HVD" message containing the tab identifier and the URL to the HVD browser server 322, in step 822 terminates the associated browser instance, and in step 823 destroys the tab information associated with the browser instance, for example by interacting with the endpoint browser server 360. In step 824 the endpoint browser extension removes occluding window information for this browser instance from the endpoint operating system 355, and returns to step 804. If the endpoint should render the new page, then the endpoint browser extension in step 826 sends a "URL changed" message containing the new tab identifier and the URL to the HVD browser server 322, and in step 828 loads the new page, and returns to step 804. Because all files should be downloaded and uploaded on the HVD side, for a file download event, the endpoint browser extension in step 830 sends a "download file" message containing the new tab identifier and the URL to the HVD browser server 322, and returns to step 804. For a file upload event, the endpoint browser extension in step 830 sends an "upload file" message containing the new tab identifier and the URL to the HVD browser server 322, and returns to step 804.

Referring now to FIG. 9, process 900 starts in step 902 by the HVD browser server 362 waiting for and accepting the establishment of communication session 385 by the endpoint browser extension. In step 904 the HVD browser server determines if the endpoint device 205 is active, e.g., is connected to a host via a VDI session, etc. If not, the process 900 ends at step 906, e.g., by terminating process 900 or returning to wait for the endpoint device 205 to become active, but if yes, then in step 908 the HVD browser server waits to receive a message from the endpoint browser extension, for example one of the messages sent by process 800. When a message is received, the HVD browser server proceeds to step 910, where it locates the tab information based on the tab identifier in the message. In step 912 the HVD browser server processes the received message according to its type, before returning to step 904.

For a "render tab on HVD" message, the HVD browser server in step 914 replaces the placeholder element 530 with the rendered page of the new URL from the message, in step 916 removes the placeholder page 530 from the browser history, and in step 918 marks the current tab as rendered by the HVD, and returns to step 904. It will be understood that, by removing the placeholder page 530 from the browser history, if the user invokes the browser's "back" control, the display will smoothly switch between the current page rendered on the HVD and the previous page rendered on the endpoint without anomalously viewing the placeholder page, which should not be seen by the user, because the endpoint composites the endpoint's frameless browser instance in its place. For a "URL changed" message, the HVD browser server in step 920 updates the browser history with the current URL, so that the user may use the "back" control to access more than one page that has been consecutively rendered on the endpoint, and in step 922 updates the current tab information with the new URL from the message, and returns to step 904. For a "download file" message, the HVD browser server in step 924 starts a download dialog using the new URL from the message to download the file, and returns to step 904. For an "upload file" message, the HVD browser server in step 926 starts an upload dialog using the new URL from the message to upload the file, and returns to step 904.

Figure 10:
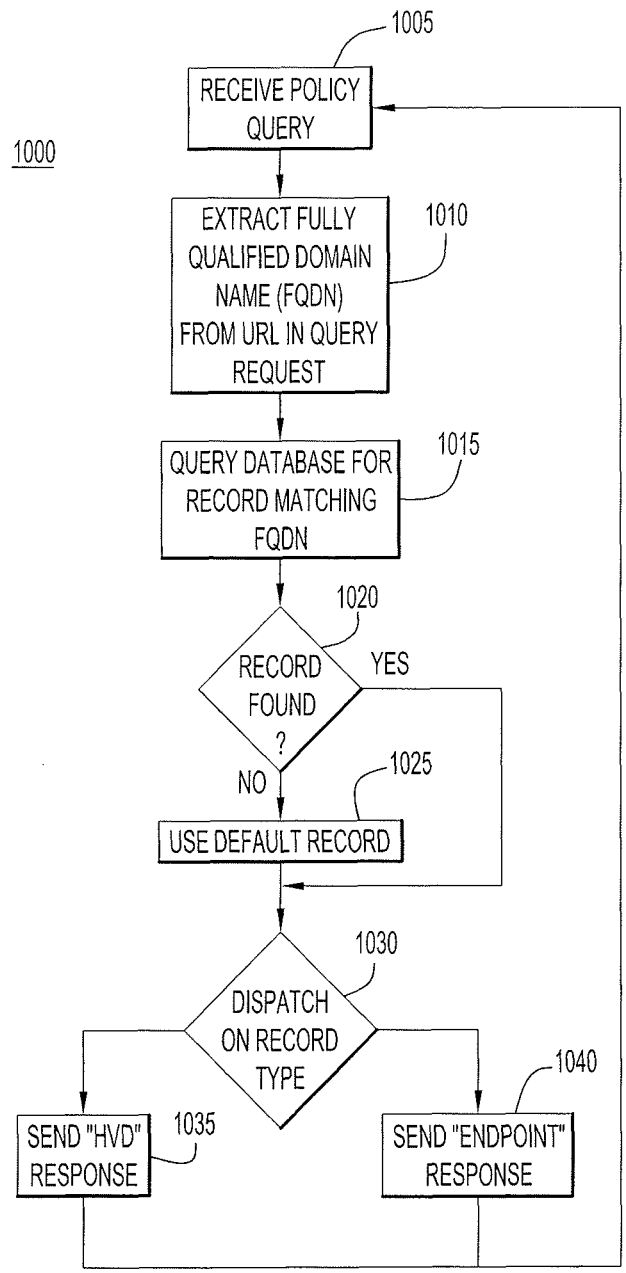
FIG. 10 is an example of a flow chart generally depicting operation of a policy agent query process.

FIG. 10 illustrates an example of a flow chart generally depicting operation of a policy agent query process 1000 performed by policy agent 40. It will be understood that this example represents a discrete policy agent, accessible from both the HVD and the endpoint as a network service, for example as depicted in FIG. 2A. In other embodiments, the policy agent may be a library co-resident on both the HVD and the endpoint, for example as depicted in FIG. 2B. In step 1005, the policy agent receives a policy query containing an URL, for example from the HVD browser extension 324 or endpoint browser extension 364 as part of process 600 or 800, respectively. In step 1010 the policy agent extracts the Fully Qualified Domain Name (FQDN) from the URL in the query request, and in step 1015 queries a database for a record matching the FQDN. In step 1020 the policy agent determines if a record was found, and if no proceeds to step 1025 and if yes proceeds to step 1030. In step 1025, the policy agent selects a default record to use, and proceeds to step 1030. The default record represents a default policy choice (e.g., to render URLs containing the current FQDN on either the HVD or the endpoint). In step 1030, the policy agent consults the located record (either the record matching the FQDN or the default record) for an indication of whether the received URL should be rendered by the HVD or endpoint, and dispatches based on the indication in the record. If the record indicates HVD, then in step 1035 the policy agent sends an "HVD" response to the querying browser extension, but if the record indicates endpoint, then in step 1040 the policy agent sends an "endpoint" response to the querying browser extension. After step 1035 or 1040, the process returns to step 1005 to wait for the next policy query.

The above description is intended by way of example only. The description of has been presented for purposes of illustration and description, but is not intended to be exhaustive or limited to the embodiments in the form disclosed. Many modifications and variations will be apparent to those of ordinary skill in the art.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed.

With respect to the Figures, which illustrate the architecture, functionality, and operation of possible implementations of methods, apparatuses, and computer readable media encoded with instructions, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    establishing an endpoint browser service on a client endpoint device;
    receiving, via a Virtual Desktop Interface protocol at the client endpoint device, a Hosted Virtual Desktop (HVD) display comprising a browser window, the browser window comprising one or more host-provided browser window elements and at least one placeholder element where a client-provided frameless window may be rendered;
    creating, by the endpoint browser service, an endpoint browser instance at the client endpoint device;
    receiving data from a web content server at the endpoint browser instance;
    generating a client endpoint display by rendering the HVD display and by the endpoint browser instance rendering the received data in a frameless window in place of the at least one placeholder element of the HVD display, wherein the frameless window comprises a web page rendering area;
    displaying the client endpoint display to enable a user of the client endpoint device to simultaneously view the host-provided browser window elements and the client-provided frameless window in a composited window;
    intercepting, at the client endpoint device, a request from the endpoint browser instance;
    sending a query from the client endpoint device to determine whether the request should be handled by the client endpoint device or an HVD host; and
    receiving a query response at the client endpoint device indicating whether the request should be handled by the client endpoint device or the HVD host.

2. The method of claim 1, wherein the frameless window further comprises one or both of a page status bar and a scroll bar.

3. The method of claim 1, further comprising:
    establishing a communication session between the endpoint browser service and a host web browser or host web browser extension on an HVD host.

4. The method of claim 3, further comprising creating the endpoint browser instance in response to the endpoint browser service receiving a request via the communication session.

5. The method of claim 3, further comprising destroying the endpoint browser instance in response to the endpoint browser service receiving a request via the said communication session.

6. The method of claim 3, further comprising, in response to the endpoint browser service receiving a request via the communication session, putting the endpoint browser instance to sleep, so that the endpoint browser instance remains active on the client endpoint device but no longer renders the frameless window.

7. The method of claim 6, further comprising awakening the endpoint browser instance, so that it resumes rendering the frameless window, in response to the endpoint browser service receiving a request via the communication session.

8. The method of claim 3, further comprising, in response to the endpoint browser service receiving a request comprising a new Uniform Resource Locator (URL) via the communication session, causing the endpoint browser instance to render a web page from a source with the new URL.

9. The method of claim 3, further comprising receiving placeholder information from the host browser extension via the communication session, wherein the placeholder information comprises one or more of the following:
    position of the at least one placeholder element in the browser window;
    size of the at least one placeholder element; and
    a description of regions of the at least one placeholder element that are occluded by other HVD applications in the HVD display.

10. The method of claim 1, wherein the request comprises a page load of a Uniform Resource Locator (URL) describing a location of a web server; and further comprising:
    if it is determined that the URL should be handled by the client endpoint device, receiving data from the web server specified by the URL, at the endpoint browser instance, and rendering the received data into the frameless window, or
    if it is determined that the URL should be handled by the HVD host, sending the URL in a request to the HVD host and terminating the endpoint browser instance.

11. The method of claim 10, further comprising, if the URL should be handled by the client endpoint device, sending a browser history update to the HVD host.

12. The method of claim 10, wherein said interception of the request is performed by an endpoint browser extension on the endpoint browser instance.

13. The method of claim 10,
    wherein sending the query comprises sending the query to a policy agent, wherein the query comprises the URL, and wherein the policy agent is accessible to the endpoint device and the HVD host.

14. The method of claim 10, wherein if the request from the endpoint browser instance is a file upload or file download request, said determination is always that the URL should be handled by the HVD host, and further comprising sending a file upload or file download request to the HVD, the request comprising the URL associated with the file upload or download.

15. The method of claim 10, wherein said determination comprises
    extracting a Fully Qualified Domain Name (FQDN) from the URL; and
    wherein sending the query comprises querying a policy database to find and select data matching the FQDN, wherein if there is no matching data default data is selected; and further comprising utilizing information in the selected data to determine whether the URL should be rendered by endpoint browser instance or an HVD host browser.

16. A method comprising:
   establishing a host web browser on a Hosted Virtual Desktop (HVD) host;
   generating an HVD display comprising a browser window, the browser window comprising one or more host-provided browser window elements and at least one placeholder window element where data may be rendered;
   intercepting a request from the host web browser, wherein the request from the host web browser comprises a page load of a Uniform Resource Locator (URL) describing the location of data on a web content server;
   determining whether the URL should be handled by the HVD host or a client endpoint device;
   if it is determined that the URL should be handled by the HVD host, receiving the data from the web content server and rendering the received data in the at least one placeholder window element, or if it is determined that the URL should be handled by the client endpoint device, sending a request to render the URL to an endpoint browser service on the client endpoint device;
   sending the HVD display to the client endpoint device via a Virtual Desktop Interface protocol using a Virtual Desktop Interface session;
   intercepting from the host web browser a request to switch tabs from a current tab to a new tab;
   detecting whether the new tab should be handled by the HVD host or by the client endpoint device, and
   if it is detected that the current tab is handled by the HVD host and the new tab should be handled by the client endpoint device, sending a request to switch to the new tab to the endpoint browser service, or if it is detected that the current tab is handled by the client endpoint device and the new tab should be handled by the HVD host, sending a request to put an endpoint browser instance handling the current tab into a sleep state.

17. The method of claim 16, wherein the interception of the request from the host web browser is performed by a host browser extension on the host web browser.

18. The method of claim 16, further comprising:
   establishing a communication session between the HVD host and the endpoint browser service on the client endpoint device.

19. The method of claim 18, further comprising sending a request to the endpoint browser service via the communication session, wherein the request is selected from the group consisting of:
   a request to create an endpoint browser instance;
   a request to destroy an endpoint browser instance;
   a request to put an endpoint browser instance to sleep, so that the endpoint browser instance remains active on the client endpoint device but does not render a frameless window;
   a request to awaken an endpoint browser instance, so that it resumes rendering a frameless window; and
   a request comprising a new Uniform Resource Locator (URL), so that the endpoint browser instance renders a web page from a source with the new URL.

20. The method of claim 18, wherein the communication session is between a host browser extension on the host web browser and the endpoint browser service.

21. The method of claim 16, wherein if the page load request is from an anchor located inside an inline frame, said determination is always that the URL should be handled by the HVD host.

22. The method of claim 16, wherein if the page load request is associated with a conferencing or screen sharing application, said determination is always that the URL should be handled by the HVD host.

23. The method of claim 16, further comprising:
   intercepting a request to create a new browser window, the request comprising a URL;
   detecting whether the new browser window should be handled by the HVD host or the client endpoint device, and
   if it is detected that the new browser window should be handled by the client endpoint device, sending a request to create a new endpoint browser instance to the endpoint browser service, the request comprising the URL, or if it is detected that the new browser window should be handled by the HVD host, allowing the new window to be created by the HVD browser.

24. The method of claim 16, further comprising sending a request to update placeholder information, said placeholder information comprising one or more of:
   position of the at least one placeholder element in the browser window;
   size of the at least one placeholder element; and
   a description of regions of the at least one placeholder element that are occluded by other HVD applications in the HVD display.

25. The method of claim 16, further comprising:
   receiving a browser history update from the client endpoint device; and
   updating a browser history of the host web browser with the browser history update.

26. An apparatus comprising:
   a display device; and
   a processor configured to:
      establish an endpoint browser service on the apparatus;
      receive, via a Virtual Desktop Interface protocol at the apparatus, a Hosted Virtual Desktop (HVD) display comprising a browser window, the browser window comprising one or more host-provided browser window elements and at least one placeholder element where a client-provided frameless window may be rendered;
      create, by the endpoint browser service, an endpoint browser instance at the apparatus;
      receive data from a web content server at the endpoint browser instance;
      generate a endpoint display by rendering the HVD display and by the endpoint browser instance rendering the received data in a frameless window in place of the at least one placeholder element of the HVD display, wherein the frameless window comprises a web page rendering area;
      display the endpoint display to enable a user of the apparatus to simultaneously view the host-provided browser window elements and the client-provided frameless window in a composited window;
      intercept, at the apparatus, a request from the endpoint browser instance;
      send a query from the apparatus to determine whether the request should be handled by the apparatus or an HVD host; and
      receive a query response at the apparatus indicating whether the request should be handled by apparatus or the HVD host.

27. The apparatus of claim 26, wherein the web content server is a content source server or a content cache server.

28. The apparatus of claim 26, wherein the apparatus is a thin client or a personal computer.

29. The apparatus of claim 26, wherein the request comprises a page load of a Uniform Resource Locator (URL) describing a location of a web server; and wherein the processor is further configured to:
   send the query to a policy agent, wherein the query comprises the URL; and
   if it is indicated that the URL should be handled by the apparatus, receive data from the web server specified by the URL at the endpoint browser instance and render the received data into the frameless window, or if it is indicated that the URL should be handled by the HVD host, send the URL in a request to the HVD host and terminate the endpoint browser instance.

30. The apparatus of claim 29, wherein the policy agent is resident on the apparatus.

31. One or more computer readable storage devices encoded with instructions that, when executed by a processor, cause the processor to:
   establish an endpoint browser service on a client endpoint device;
   receive, via a Virtual Desktop Interface protocol at the client endpoint device, a Hosted Virtual Desktop (HVD) display comprising a browser window, the browser window comprising one or more host-provided browser window elements and at least one placeholder element where a client-provided frameless window may be rendered;
   create, by the endpoint browser service, an endpoint browser instance at the client endpoint device;
   receive data from a web content server at the endpoint browser instance;
   generate a client endpoint display by rendering the HVD display and by the endpoint browser instance rendering the received data in a frameless window in place of the at least one placeholder element of the HVD display, wherein the frameless window comprises a web page rendering area;
   display the client endpoint display to enable a user of the client endpoint device to simultaneously view the host-provided browser window elements and the client-provided frameless window in a composited window,
   intercept a request from the endpoint browser instance;
   send a query to determine whether the request should be handled by the client endpoint device or an HVD host; and
   receive a query response indicating whether the request should be handled by the client endpoint device or the HVD host.

32. The one or more computer readable storage devices of claim 31, wherein the instructions further cause the processor to establish a communication session between the endpoint browser service and a host web browser or host web browser extension on an HVD host.

33. The one or more computer readable storage devices of claim 31, wherein the request comprises a page load of a Uniform Resource Locator (URL) describing a location of a web server; and wherein the instructions further cause the processor to:
   send the query to a policy agent, wherein the query comprises the URL; and
   if it is determined that the URL should be handled by the client endpoint device, receive data from the web server specified by the URL, at the endpoint browser instance, and render the received data into the frameless window, or if it is determined that the URL should be handled by the HVD host, send the URL in a request to the HVD host and terminate the endpoint browser instance.

34. The one or more computer readable storage devices of claim 33, wherein the policy agent is resident on an apparatus comprising the processor.

* * * * *